(12) United States Patent
Noureldin et al.

(10) Patent No.: US 11,078,809 B2
(45) Date of Patent: Aug. 3, 2021

(54) NATURAL GAS LIQUID FRACTIONATION PLANT WASTE HEAT CONVERSION TO SIMULTANEOUS POWER AND POTABLE WATER USING KALINA CYCLE AND MODIFIED MULTI-EFFECT-DISTILLATION SYSTEM

(71) Applicant: Saudi Arabian Oil Company, Dhahran (SA)

(72) Inventors: Mahmoud Bahy Mahmoud Noureldin, Dhahran (SA); Akram Hamed Mohamed Kamel, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/685,412

(22) Filed: Nov. 15, 2019

(65) Prior Publication Data
US 2020/0080447 A1    Mar. 12, 2020

Related U.S. Application Data

(63) Continuation of application No. 15/842,205, filed on Dec. 14, 2017, now Pat. No. 10,480,354.
(Continued)

(51) Int. Cl.
  *F01K 25/06*     (2006.01)
  *F25J 3/02*      (2006.01)
  (Continued)

(52) U.S. Cl.
  CPC ............ *F01K 25/06* (2013.01); *B01D 1/0058* (2013.01); *B01D 1/26* (2013.01); *B01D 3/007* (2013.01);
  (Continued)

(58) Field of Classification Search
  CPC ...... F01K 25/06; F25J 3/0214; F25J 2260/02; F25J 3/0238; F25J 3/0242; F25J 3/0247;
  (Continued)

(56) References Cited

U.S. PATENT DOCUMENTS

| 4,002,525 A | 1/1977 | Baierl et al. |
| 4,907,410 A | 3/1990 | Chang |

(Continued)

FOREIGN PATENT DOCUMENTS

| WO | 2006039182 | 4/2006 |
| WO | 2012003525 | 1/2012 |

(Continued)

OTHER PUBLICATIONS

Gulf Cooperation Council Examination Report issued in GCC Application No. GC 2018-35802 dated Dec. 30, 2019, 6 pages.
(Continued)

*Primary Examiner* — Shafiq Mian
(74) *Attorney, Agent, or Firm* — Fish & Richardson P.C.

(57) ABSTRACT

Flowing a first buffer fluid and a second buffer fluid through a heat exchanger network thermally coupled to heat sources of a Natural Gas Liquid (NGL) fractionation plant, and transferring heat from the heat sources to the first buffer fluid and the second buffer fluid. Generating power via a first sub-system thermally coupled to the heat exchanger network and generating potable water from brackish water via a second sub-system thermally coupled to the heat exchanger network.

20 Claims, 17 Drawing Sheets

Related U.S. Application Data

(60) Provisional application No. 62/542,687, filed on Aug. 8, 2017.

(51) Int. Cl.

| | | |
|---|---|---|
| *C10G 5/06* | (2006.01) | |
| *B01D 1/00* | (2006.01) | |
| *B01D 3/06* | (2006.01) | |
| *C10G 7/00* | (2006.01) | |
| *B01D 1/26* | (2006.01) | |
| *B01D 3/00* | (2006.01) | |
| *B01D 3/14* | (2006.01) | |
| *B01D 3/42* | (2006.01) | |
| *C02F 1/00* | (2006.01) | |
| *C02F 1/16* | (2006.01) | |
| *C10L 3/10* | (2006.01) | |
| *F22B 1/18* | (2006.01) | |
| *F22B 3/02* | (2006.01) | |
| *F01K 27/02* | (2006.01) | |
| *F01K 25/10* | (2006.01) | |
| *C02F 103/08* | (2006.01) | |

(52) U.S. Cl.
CPC .............. *B01D 3/065* (2013.01); *B01D 3/146* (2013.01); *B01D 3/4211* (2013.01); *C02F 1/008* (2013.01); *C02F 1/16* (2013.01); *C10G 5/06* (2013.01); *C10G 7/00* (2013.01); *C10L 3/101* (2013.01); *F22B 1/1892* (2013.01); *F22B 3/02* (2013.01); *F25J 3/0209* (2013.01); *F25J 3/0214* (2013.01); *F25J 3/0233* (2013.01); *F25J 3/0238* (2013.01); *F25J 3/0242* (2013.01); *F25J 3/0247* (2013.01); *C02F 2103/08* (2013.01); *C02F 2303/10* (2013.01); *C10L 2290/06* (2013.01); *C10L 2290/543* (2013.01); *C10L 2290/56* (2013.01); *F01K 25/10* (2013.01); *F01K 27/02* (2013.01); *F25J 2200/02* (2013.01); *F25J 2200/70* (2013.01); *F25J 2200/74* (2013.01); *F25J 2205/70* (2013.01); *F25J 2215/62* (2013.01); *F25J 2220/66* (2013.01); *F25J 2220/68* (2013.01); *F25J 2240/70* (2013.01); *F25J 2260/02* (2013.01); *F25J 2270/12* (2013.01); *F25J 2270/60* (2013.01)

(58) Field of Classification Search
CPC .......... F22B 3/02; F22B 1/1892; B01D 3/007; B01D 3/146; B01D 3/4211; C02F 1/16; C02F 1/008; C10L 3/101
See application file for complete search history.

(56) References Cited

U.S. PATENT DOCUMENTS

| | | | | |
|---|---|---|---|---|
| 5,240,476 A | * | 8/1993 | Hegarty | B01D 53/1418 |
| | | | | 95/161 |
| 5,557,936 A | * | 9/1996 | Drnevich | F01K 25/065 |
| | | | | 60/649 |
| 5,600,049 A | | 2/1997 | Sy | |
| 5,685,152 A | | 11/1997 | Sterling | |
| 6,216,436 B1 | | 4/2001 | Ranasinghe | |
| 6,733,636 B1 | * | 5/2004 | Heins | E21B 43/2408 |
| | | | | 203/1 |
| 7,257,966 B2 | | 8/2007 | Lee et al. | |
| 7,458,231 B1 | | 12/2008 | Vanden | |
| 8,776,703 B2 | | 7/2014 | Hall | |
| 9,598,993 B2 | | 3/2017 | Younes et al. | |
| 9,657,937 B2 | | 5/2017 | Niass | |
| 9,745,871 B2 | | 8/2017 | Noureldin et al. | |
| 9,828,885 B2 | | 11/2017 | Noureldin et al. | |
| 9,851,153 B2 | | 12/2017 | Noureldin et al. | |
| 9,879,918 B2 | | 1/2018 | Noureldin et al. | |
| 9,891,004 B2 | | 2/2018 | Noureldin et al. | |
| 10,690,407 B2 | | 6/2020 | Noureldin et al. | |
| 10,851,679 B2 | | 12/2020 | Noureldin et al. | |
| 2002/0166336 A1 | | 11/2002 | Wilkinson et al. | |
| 2006/0065015 A1 | * | 3/2006 | McCoy | C07C 7/09 |
| | | | | 62/620 |
| 2008/0174115 A1 | | 7/2008 | Lambirth | |
| 2008/0190135 A1 | | 8/2008 | Mak | |
| 2008/0289588 A1 | * | 11/2008 | Wees | F01K 13/00 |
| | | | | 122/406.1 |
| 2009/0000299 A1 | * | 1/2009 | Ast | F01K 23/04 |
| | | | | 60/618 |
| 2010/0326131 A1 | | 12/2010 | Lengert | |
| 2011/0000205 A1 | | 1/2011 | Hauer | |
| 2013/0334060 A1 | * | 12/2013 | Koseoglu | C10K 3/04 |
| | | | | 205/637 |
| 2013/0341929 A1 | | 12/2013 | Ho | |
| 2014/0037510 A1 | | 2/2014 | Peng et al. | |
| 2014/0090405 A1 | * | 4/2014 | Held | F25B 1/06 |
| | | | | 62/79 |
| 2014/0223911 A1 | | 8/2014 | Ikegami | |
| 2015/0377076 A1 | * | 12/2015 | Giegel | F01K 23/12 |
| | | | | 60/645 |
| 2015/0377079 A1 | * | 12/2015 | Noureldin | C10J 3/84 |
| | | | | 60/671 |
| 2016/0045841 A1 | * | 2/2016 | Kaplan | B01D 3/06 |
| | | | | 429/49 |
| 2016/0053184 A1 | * | 2/2016 | Wheeler | B01D 3/346 |
| | | | | 585/241 |
| 2016/0369674 A1 | | 12/2016 | Younes et al. | |
| 2017/0058708 A1 | | 3/2017 | Noureldin et al. | |
| 2017/0058711 A1 | * | 3/2017 | Noureldin | F01K 25/065 |
| 2017/0058719 A1 | | 3/2017 | Noureldin et al. | |
| 2017/0058721 A1 | | 3/2017 | Noureldin et al. | |
| 2019/0048759 A1 | | 2/2019 | Noureldin et al. | |

FOREIGN PATENT DOCUMENTS

| | | |
|---|---|---|
| WO | 2017035150 | 3/2017 |
| WO | 2017035166 | 3/2017 |

OTHER PUBLICATIONS

Gulf Cooperation Council Examination Report issued in GCC Application No. GC 2018-35793 dated Dec. 30, 2019, 5 pages.
Gulf Cooperation Council Examination Report issued in GCC Application No. GC 2018-35800 dated Dec. 30, 2019, 5 pages.
CN Office Action issued in Chinese Application No. 201880064324.8 dated Oct. 28, 2020, 12 pages (With English Translation).
CN Office Action in Chinese Application No. 201880064998.8, dated Nov. 24, 2020, 8 pages (With English Translation).
GCC Examination Report in GCC Appln. No. GC 2018-357994, dated Jan. 29, 2020, 6 pages.
GCC Examination Report in GCC Appln. No. GC 2018-35801, dated Feb. 9, 2020, 4 pages.
GCC Examination Report in GCC Appln. No. GC 2018-35799, dated Feb. 9, 2020, 4 pages.
GCC Examination Report in GCC Appln. No. GC 2018-35795, dated Feb. 9, 2020, 3 pages.
Chinese Office Action in Chinese Appln. No. 201880061406.7, dated Sep. 18, 2020, 17 pages, English Translation.
Chinese Office Action in Chinese Appln. No. 201880063810.8, dated Sep. 21, 2020, 16 pages, English Translation.
Tong, "Introduction on Light Hydrocarbon Recovery Process in Onshore Terminal of the Chunxiao Gas Field," Natural Gas Technology, 2007, 1(1), 7 pages, English Abstract.
Gulf Cooperation Council Examination Report issued in GCC Application No. GC 2018-35796 dated Dec. 30, 2019, 5 pages.
GCC Examination Report in GCC Appln. No. GC 2018-35801, dated Apr. 28, 2020, 3 pages.
GCC Examination Report in GCC Appln. No. GC 2018-35794, dated May 30, 2020, 3 pages.

(56) References Cited

OTHER PUBLICATIONS

International Search Report and Written Opinion issued in International Application No. PCT/US2018/045554 dated Nov. 22, 2018, 21 pages.
International Search Report and Written Opinion issued in International Application No. PCT/US2018/045557 dated Nov. 22, 2018, 19 pages.
International Search Report and Written Opinion issued in International Application No. PCT/US2018/045550 dated Nov. 22, 2018, 18 pages.
International Search Report and Written Opinion issued in International Application No. PCT/US2018/045629 dated Nov. 22, 2018, 16 pages.
International Search Report and Written Opinion issued in International Application No. PCT/US2018/045531 dated Nov. 22, 2018, 20 pages.
International Search Report and Written Opinion issued in International Application No. PCT/US2018/045547 dated Nov. 22, 2018, 20 pages.
International Search Report and Written Opinion issued in International Application No. PCT/US2018/045640 dated Nov. 22, 2018, 19 pages.
International Search Report and Written Opinion issued in International Application No. PCT/US2018/045535 dated Nov. 22, 2018, 23 pages.
International Search Report and Written Opinion issued in International Application No. PCT/US2018/045558 dated Nov. 22, 2018, 22 pages.
International Search Report and Written Opinion issued in International Application No. PCT/US2018/045541 dated Nov. 22, 2018, 17 pages.
International Search Report and Written Opinion issued in International Application No. PCT/US2018/045537 dated Nov. 22, 2018, 16 pages.
International Search Report and Written Opinion issued in International Application No. PCT/US2018/045564 dated Nov. 22, 2018, 21 pages.
International Search Report and Written Opinion issued in International Application No. PCT/US2018/045622 dated Nov. 22, 2018, 18 pages.
Ammar et al., "Low grade thermal energy sources and uses from the process industry in the UK," Applied Energy, Elsevier Science Publishers, vol. 89, No. 1, Jun. 1, 2011, 18 pages.
Bahnassi et al., "Achieving product specifications for ethane through to pentane plus from NGL fraction plants," AIChE Fall Conference, Jan. 1, 2005, 21 pages.
Gaberiel et al., "Optimization across the water-energy nexus for integrating heat, power, and water for industrial processes, couples with the hybrid thermal-membrane desalination," Industrial and Engineering Chemistry Research, vol. 55, No. 12, Feb. 16, 2016, 25 pages.
Gnaneswar Gude et al., "Feasibility study of a new two-stage low temperature desalination process," Energy Conversation and Management, Elsevier Science Publishers, vol. 56, Nov. 30, 2011, 7 pages.
Gonzalez-Bravo et al., "Optimal Design for Water Desalination Systems Involving Waste Heat Recovery," Industrial and Engineering Chemistry Research, vol. 56, No. 7, Feb. 8, 2017, 14 pages.
Kwak et al., "Integrated design and optimization of technologies for utilizing low grade heat in process industries," Applied Energy, vol. 131, Oct. 1, 2014, 16 pages.
Lira-Barragan et al., "Sustainable Integration of Trigeneration Systems with Head Exchanger Networks," Industrial & Engineering Chemistry Research, vol. 53, No. 7, Feb. 4, 2014, 19 pages.
M. Mehrpooya et al., "Introducing a novel integrated NGL recovery process configuration (with a self-refrigeration system (open-closed cycle)) with minimum energy requirement," Chemical Engineering and Processing: Process Intensification, Apr. 2010, vol. 49, No. 4, pp. 376-388.
Neill and Gunter, "Generation of Electric Power from Waste Heat in the Western Canadian Oil and Gas Industry Phase 1 Report-Scoping Evaluations Rev A," Petroleum Technology Alliance Canada (PTAC), Oct. 2007, 148 pages.
Ophir et al., "Advanced MED process for most economical sea water desalination," Desalination, Elsevier, Amsterdam, NL, vol. 182, No. 1-3, Nov. 1, 2005, 12 pages.
Rahimi et al., "A novel process for low grade heat driven desalination," Desalination, Oct. 15, 2014, vol. 351, pp. 202-212.
Rosenzweig, "Cryogenics for natural gas extraction/fractionation," Chemical engineering, access intelligence association, vol. 1, No. 77, Jan. 12, 1970, 3 pages.
Zhang et al., "Network modeling and design for low grade heat recovery, refrigeration, and utilization in Industrial parks," Industrial and Engineering Chemistry Research, vol. 55, No. 36, Sep. 14, 2016, 13 pages.
Zhu et al., "Hybrid vapor compression refrigeration system with an integrated ejector cooling cycle," International Journal of Refrigeration, vol. 35, 1, pp. 68-78 11 pages.
GCC Examination Report issued in Gulf Cooperation Council Application No. GC 2018-35795 dated Jun. 21, 2020, 3 pages.
GCC Examination Report issued in Gulf Cooperation Council Application No. GC 2018-35799 dated Jun. 22, 2020, 4 pages.
CN Office Action in Chinese Appln. No. 201880061406.7, dated Mar. 8, 2021, 10 pages (With English Translation).
CN Office Action in Chinese Appln. No. 201880063810.8, dated Mar. 8, 2021, 8 pages (With English Translation).
GCC Examination Report in GCC Appln. No. GC 2018-35795, dated Oct. 28, 2020, 4 pages.
GCC Examination Report in GCC Appln. No. GC 2018-35799, dated Oct. 28, 2020, 3 pages.
CN Office Action in Chinese Appln. No. 201880063809.5, dated Dec. 7, 2020, 13 pages (With English Translation).
CN Office Action in Chinese Appln. No. 201880063863, dated Dec. 7, 2020, 15 pages, (With English Translation).
CN Office Action in Chinese Appln. No. 201880065047.2, dated Dec. 9, 2020, 13 pages, (With English Translation).
CN Office Action in Chinese Appln. No. 201880064998.8, dated Feb. 18, 2021, 20 pages (With English Translation).

* cited by examiner

NATURAL GAS LIQUID FRACTIONATION PLANT WASTE HEAT CONVERSION TO SIMULTANEOUS POWER AND POTABLE WATER USING KALINA CYCLE AND MODIFIED MULTI-EFFECT-DISTILLATION SYSTEM

CROSS-REFERENCE TO RELATED APPLICATIONS

This application is a continuation of U.S. application Ser. No. 15/842,205 filed Dec. 14, 2017, which claims the benefit of the filing date of U.S. Provisional Application Ser. No. 62/542,687 filed Aug. 8, 2017. The contents of both applications are incorporated by reference in their entirety as part of this application.

TECHNICAL FIELD

This disclosure relates to operating industrial facilities, for example, a natural gas liquid fractionation plant or other industrial facilities that include operating plants that generate heat, for example, a natural gas liquid fractionation plant.

BACKGROUND

Natural gas liquid (NGL) processes are chemical engineering processes and other facilities used in petroleum refineries to transform natural gas into products, for example, liquefied petroleum gas (LPG), gasoline, kerosene, jet fuel, diesel oils, fuel oils, and such products. NGL facilities are large industrial complexes that involve many different processing units and auxiliary facilities, for example, utility units, storage tanks, and such auxiliary facilities. Each refinery can have its own unique arrangement and combination of refining processes determined, for example, by the refinery location, desired products, economic considerations, or such factors. The NGL processes that are implemented to transform the natural gas into the products such as those listed earlier can generate heat, which may not be reused, and byproducts, for example, greenhouse gases (GHG), which may pollute the atmosphere. It is believed that the world's environment has been negatively affected by global warming caused, in part, due to the release of GHG into the atmosphere.

SUMMARY

This specification describes technologies relating to cooling capacity generation, power generation or potable water production from waste heat in a natural gas liquid (NGL) fractionation plant.

The present disclosure includes one or more of the following units of measure with their corresponding abbreviations, as shown in Table 1:

TABLE 1

| Unit of Measure | Abbreviation |
| --- | --- |
| Degrees Celsius | ° C. |
| Megawatts | MW |
| One million | MM |
| British thermal unit | Btu |
| Hour | h |
| Pounds per square inch (pressure) | psi |
| Kilogram (mass) | Kg |
| Second | S |

TABLE 1-continued

| Unit of Measure | Abbreviation |
| --- | --- |
| Cubic meters per day | $m^3$/day |
| Fahrenheit | F. |

Certain aspects of the subject matter described here can be implemented as a system. In an example implementation, the system includes a waste heat recovery heat exchanger network coupled to multiple heat sources of a Natural Gas Liquid (NGL) fractionation plant. The heat exchanger network is configured to transfer at least a portion of heat generated at the multiple heat sources to a first buffer fluid and a second buffer fluid flowed through the first heat exchanger network. The system includes a first sub-system configured to generate power. The first sub-system is thermally coupled to the waste heat recovery heat exchanger. The system includes a second sub-system configured to generate potable water from brackish water. The second sub-system is thermally coupled to the waste heat recovery heat exchanger.

In an aspect combinable with the example implementation, the system includes a control system connected to the heat exchanger network and the first sub-system or the heat exchanger network and the second sub-system or the heat exchanger network, the first sub-system and the second sub-system. The control system is configured to flow fluids between the NGL fractionation plant, the heat exchanger network one or both of the first sub-system or the second sub-system.

In another aspect combinable with any of the previous aspects, the fluids include one or more of a NGL fractionation plant stream or a buffer fluid.

In another aspect combinable with any of the previous aspects, the multiple heat sources include a first multiple sub-units of the NGL fractionation plant, the first multiple sub-units including a de-ethanizer section, a propane dehydration section, a de-propanizer section, a butane de-hydrator section, and a de-butanizer section, a second multiple sub-units of the NGL fractionation plant, the second multiple sub-units including a de-pentanizer section, an Amine-Di-Iso-Propanol (ADIP) regeneration section, a natural gas de-colorizing section, a propane vapor recovery section and a propane product refrigeration section, and a third multiple sub-units of the NGL fractionation a propane product sub-cooling section, a butane product refrigeration section, an ethane production section and a Reid Vapor Pressure (RVP) control section.

In another aspect combinable with any of the previous aspects, the heat exchanger network includes multiple heat exchangers.

In another aspect combinable with any of the previous aspects, the multiple heat exchangers include a first subset including one or more of the multiple heat exchangers thermally coupled to the first multiple sub-units of the NGL fractionation plant.

In another aspect combinable with any of the previous aspects, the first subset includes a first heat exchanger thermally coupled to the de-ethanizer section and configured to heat a first buffer stream using heat carried by a de-ethanizer refrigeration compressor outlet stream from the de-ethanizer section, a second heat exchanger thermally coupled to the propane dehydration section and configured to heat a second buffer stream using heat carried by a propane de-hydration outlet stream from the propane de-hydration section, a fourth heat exchanger thermally coupled to the de-propanizer section and configured to heat a third buffer stream using heat carried by a de-propanizer overhead outlet stream from the de-propanizer section, a fifth heat exchanger thermally coupled to the butane de-hydrator section and configured to heat a fourth buffer stream using heat carried by a butane de-hydrator outlet stream, a sixth heat exchanger thermally coupled to the de-butanizer section and configured to heat a fifth buffer stream using heat carried by a de-butanizer overhead outlet stream from the de-butanizer section, and a seventh heat exchanger thermally coupled to the de-butanizer section configured to heat a sixth buffer stream using heat carried by a de-butanizer bottoms outlet stream from the de-butanizer section.

In another aspect combinable with any of the previous aspects, the multiple heat exchangers includes a second subset including one or more of the multiple heat exchangers thermally coupled to the second multiple sub-units of the NGL fractionation plant.

In another aspect combinable with any of the previous aspects, the second subset includes an eighth heat exchanger thermally coupled to the de-pentanizer section and configured to heat a seventh buffer stream using heat carried by a de-pentanizer overhead outlet stream from the de-pentanizer section, a ninth heat exchanger thermally coupled to the ADIP regeneration section and configured to heat an eighth buffer stream using heat carried by an ADIP regeneration section overhead outlet stream, a tenth heat exchanger thermally coupled to the ADIP regeneration section and configured to heat a ninth buffer stream using heat carried by an ADIP regeneration section bottoms outlet stream, an eleventh heat exchanger thermally coupled to the natural gas de-colorizing section and configured to heat a tenth buffer stream using heat carried by a natural gas de-colorizing section pre-flash drum overhead outlet stream, a twelfth heat exchanger thermally coupled to the natural gas de-colorizing section and configured to heat an eleventh buffer stream using heat carried by a natural gas de-colorizer overhead outlet stream, a thirteenth heat exchanger thermally coupled to the propane vapor recovery section and configured to heat a twelfth buffer stream using heat carried by a propane vapor recovery compressor outlet stream, and a fourteenth heat exchanger thermally coupled to the propane product refrigeration section and configured to heat a thirteenth buffer stream using heat carried by a propane refrigeration compressor outlet stream from the propane product refrigeration section.

In another aspect combinable with any of the previous aspects, the multiple heat exchangers includes a third subset including one or more of the multiple heat exchangers thermally coupled to the third multiple sub-units of the NGL fractionation plant.

In another aspect combinable with any of the previous aspects, the third subset includes a fifteenth heat exchanger thermally coupled to the propane product sub-cooling and configured to heat a fourteenth buffer stream using heat carried by a propane main compressor outlet stream from the propane product sub-cooling section, a sixteenth heat exchanger thermally coupled to the butane product refrigeration section and configured to heat a fifteenth buffer stream using heat carried by a butane refrigeration compressor outlet stream from the butane product refrigeration section, a seventeenth heat exchanger thermally coupled to the ethane production section and configured to heat a sixteenth buffer stream using heat carried by an ethane dryer outlet stream, and an eighteenth heat exchanger thermally coupled to the RVP control section and configured to heat a seventeenth buffer stream using heat carried by a RVP control column overhead outlet stream.

In another aspect combinable with any of the previous aspects, the buffer stream is a first buffer stream of a first type. The multiple heat exchangers include a third heat exchanger thermally coupled to the de-pentanizer section, and configured to heat a second buffer stream of a second type different from the first type using heat carried by the de-propanizer overhead outlet stream.

In another aspect combinable with any of the previous aspects, the first buffer stream of the first type includes oil and the second buffer stream of the second type includes water.

In another aspect combinable with any of the previous aspects, the system includes a first storage tank to store the first buffer stream and a second storage tank to store the second buffer stream.

In another aspect combinable with any of the previous aspects, the control system is configured to flow the first buffer stream or the second buffer stream or both from the respective storage tank to the heat exchanger network.

In another aspect combinable with any of the previous aspects, the first sub-system includes a Kalina cycle system configured to produce power using at least a portion of heat carried by the first buffer stream.

In another aspect combinable with any of the previous aspects, the second sub-system includes a modified multi-effect-distillation (MED) system configured to produce potable water using at least a portion of heat carried by the third heat exchanger.

The details of one or more implementations of the subject matter described in this specification are set forth in the accompanying drawings and the detailed description. Other features, aspects, and advantages of the subject matter will become apparent from the description, the drawings, and the claims.

BRIEF DESCRIPTION OF THE DRAWINGS

FIG. 1O is a schematic diagram of a natural gasoline vapor pressure control section waste heat recovery system in a NGL fractionation plant.

DETAILED DESCRIPTION

NGL Plant

Figure 1A:
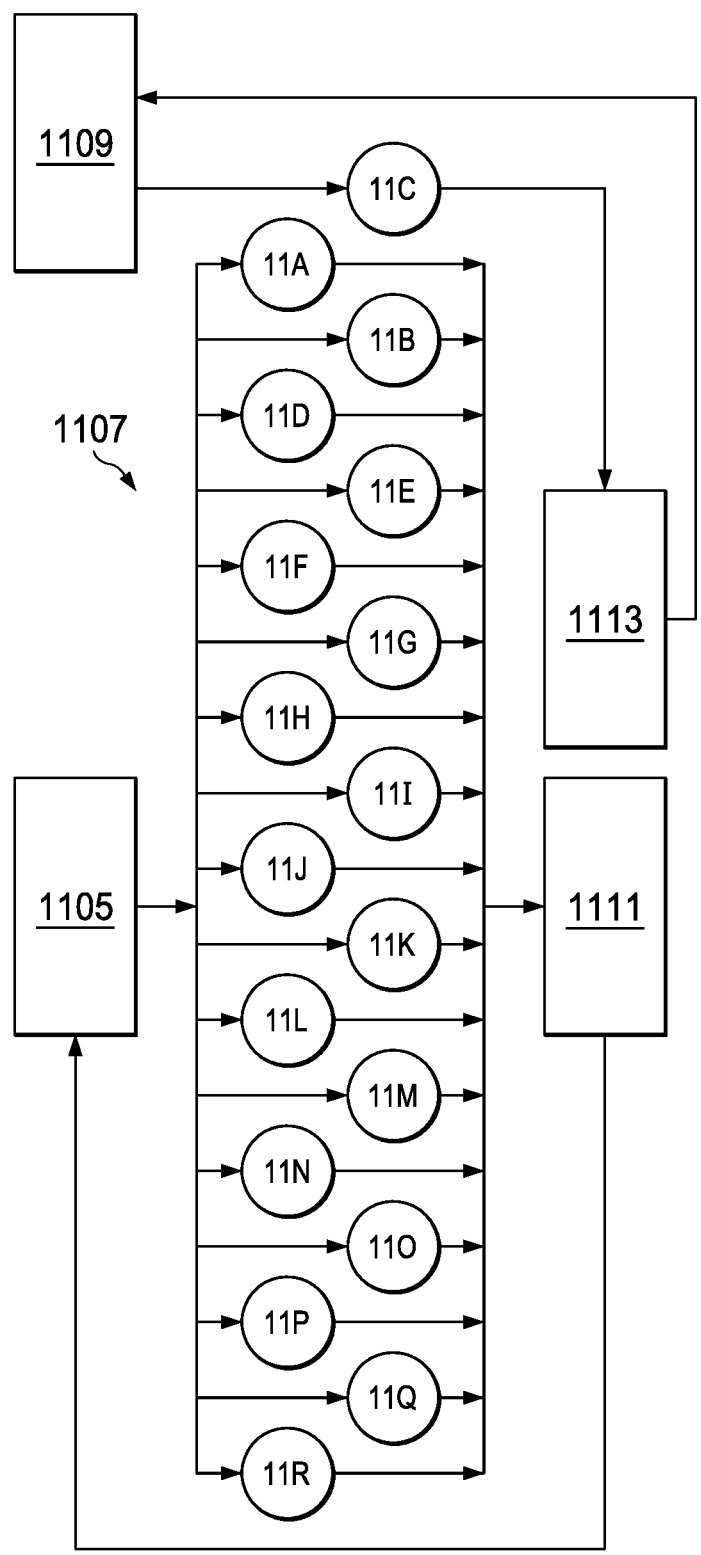
FIG. 1A is a schematic diagram of an example of a low grade waste heat recovery system.

Gas processing plants can purify raw natural gas or crude oil production associated gases (or both) by removing common contaminants such as water, carbon dioxide and hydrogen sulfide. Some of the substances which contaminate natural gas have economic value and can be processed or sold or both. Upon the separation of methane gas, which is useful as sales gas for houses and power generation, the remaining hydrocarbon mixture in liquid phase is called natural gas liquids (NGL). The NGL is fractionated in a separate plant or sometimes in the same gas processing plant into ethane, propane and heavier hydrocarbons for several versatile uses in chemical and petrochemical as well as transportation industries. The NGL fractionation plant uses the following processes or sections: fractionation, product treating, and natural gasoline processing. The fractionation processes or sections can include heat sources (also commonly referred to as streams) including, but not limited to, a propane condenser, a propane refrigerant condenser, a naphtha cooler, a de-pentanizer condenser, an amine-di-isopropanol (ADIP) cooler, a regenerator overhead (OVHD) condenser, a Reid vapor pressure (RVP) column condenser, a de-propanizer condenser, a de-butanizer condenser, or combinations thereof. The product treating processes or sections can include the following non-limiting heat sources: a propane dehydrator condenser, a butane dehydrator condenser, a propane condenser, an air-cooled condenser, a regeneration gas cooler, and a butane condenser, or combinations thereof. The natural gasoline processing processes or sections can include, but are not limited to, a natural gasoline (NG) flash vapor condenser, a NG de-colorizer condenser, or combinations thereof.

Fractionation Section

Fractionation is the process of separating the different components of natural gas. Separation is possible because each component has a different boiling point. At temperatures less than the boiling point of a particular component, that component condenses to a liquid. It is also possible to increase the boiling point of a component by increasing the pressure. By using columns operating at different pressures and temperatures, the NGL fractionation plant is capable of separating ethane, propane, butane, pentane, or combinations thereof (with or without heavier associated hydrocarbons) from NGL fractionation feeds. De-ethanizing separates ethane from C2+ NGL, where C2 refers to a molecule containing two carbon atoms (ethane), and where C2+ refers to a mixture containing molecules having two or more carbon atoms, for example, a NGL containing C2, C3, C4, C5 can be abbreviated as "C2+ NGL". De-propanizing and de-butanizing separate propane and butane, respectively, from C3+ NGL and C4+NGL, respectively. Because the boiling points of heavier natural gases are closer to each other, such gases can be harder to separate compared to lighter natural gases. Also, a rate of separation of heavier components is less than that of comparatively lighter components. In some instances, the NGL fractionation plant can implement, for example, about 45 distillation trays in the de-ethanizer, about 50 trays in the de-propanizer, and about 55 trays in the de-butanizer.

The fractionation section can receive a feed gas containing C2+ NGL from gas plants, which are upstream plants that condition and sweeten the feed gas, and produce a sales gas, such as a C1/C2 mixture, where C1 is about 90%, as a final product. The C2+ NGL from gas plants can be further processed in the NGL fractionation plant for C2+ recovery. From feed metering or surge unit metering (or both), feed flows to the three fractionation modules, namely, the de-ethanizing module, the de-propanizing module and the de-butanizing module, each of which is described later.

De-Ethanizer Module (or De-Ethanizer Column)

The C2+ NGL is pre-heated before entering the de-ethanizer column for fractionation. The separated ethane leaves the column as overhead gas. The ethane gas is condensed by a closed-loop propane refrigeration system. After being cooled and condensed, the ethane is a mixture of gas and liquid. The liquid ethane is separated and pumped back to the top of the column as reflux. The ethane gas is warmed in an economizer and then sent to users. The bottoms product from the de-ethanizer reboiler is C3+ NGL, which is sent to the de-propanizer module.

De-Propanizer Module (or De-Propanizer Column)

From the de-ethanizer module, C3+ NGL enters the de-propanizer module for fractionation. The separated propane leaves the column as overhead gas. The gas is condensed using coolers. The propane condensate is collected in a reflux drum. Some of the liquid propane is pumped back to the column as reflux. The rest of the propane is either treated or sent to users as untreated product. The bottoms product from the depropanizer reboiler, C4+ is then sent to the de-butanizer module De-Butanizer Module (or De-Butanizer Column)

C4+ enters the de-butanizer module for fractionation. The separated butane leaves the column as overhead gas. The gas is condensed using coolers. The butane condensate is collected in a reflux drum. Some of the liquid butane is pumped back to the column as reflux. The rest of the butane is either treated or sent to users as untreated product. The bottoms product from the debutanizer reboiler, C5+ natural gas (NG) goes on to a RVP control section (which may also be referred to as a rerun unit), which will be discussed in greater detail in a later section.

Product Treating Section

While ethane requires no further treatment, propane and butane products are normally treated to remove hydrogen sulfide ($H_2S$), carbonyl sulfide (COS), and mercaptan sulfur (RSH). Then, the products are dried to remove any water. All exported product is treated, while untreated products can go to other industries. As described later, propane receives ADIP treating, MEROX™ (Honeywell UOP; Des Plaines, Ill.) treating, and dehydration. Butane receives MEROX treating, and dehydration.

ADIP Treating Section

ADIP is a solution of di-isopropanol amine and water. ADIP treating extracts $H_2S$ and COS from propane. The ADIP solution, through contact with the sour propane, absorbs the $H_2S$ and COS. The ADIP solution first contacts the sour propane in an extractor. In the extractor, the ADIP absorbs most of the $H_2S$ and some of the COS. The propane then passes through a mixer/settler train where the propane contacts with ADIP solution to extract more $H_2S$ and COS. This partially sweetened propane is cooled and then washed with water to recover the ADIP entrained with the propane. The propane is then sent to MEROX treating, which is described later. The rich ADIP that has absorbed the $H_2S$ and COS leaves the bottom of the extractor and is regenerated into lean ADIP for reuse. The regenerator column has a temperature and pressure that are suitable for acid gas removal. When the rich ADIP enters the regenerator, the entrained acid gases are stripped. As the acid gases leaves the regenerator as overhead, any free water is removed to prevent acid formation. The acid gases are then sent to flare. The lean ADIP leaves the extractor bottom and is cooled and filtered. Lean ADIP returns to the last mixer/settler and flows back through the system in the counter-current direction of the propane to improve contact between the propane and ADIP, which improves $H_2S$ and COS extraction.

C3/C4 MEROX Treating Section

MEROX treating removes mercaptan sulfur from C3/C4 product. Mercaptans are removed using a solution of sodium hydroxide (NaOH), also known by the commercial name caustic soda (hereinafter referred to as "caustic") and MEROX. The MEROX catalyst facilitates the oxidation of mercaptans to disulfides. The oxidation takes place in an alkaline environment, which is provided by using the caustic solution. MEROX treating for C3 and C4 is similar. Both products are prewashed with caustic to remove any remaining traces of $H_2S$, COS, and $CO_2$. This prevents damage to the caustic that is used in MEROX treating. After prewashing, product flows to an extractor, where a caustic solution with MEROX catalyst contacts with the product. The caustic/catalyst solution converts the mercaptans into mercaptides. The sweetened product, which is lean on acid gases, leaves the extractor as overhead and any remaining caustic is separated. Caustic leaves the bottom of both product extractors rich with mercaptides. The rich caustic is regenerated into lean caustic for reuse. The C3/C4 extraction sections share a common caustic regeneration section, namely, an oxidizer. Before entering the bottom of the oxidizer, the rich caustic is injected with MEROX catalyst to maintain proper catalyst concentration, heated, and mixed with process air. In the oxidizer, the mercaptides are oxidized into disulfides. The mixture of disulfides, caustic, and air leave the oxidizer as overhead. The air, disulfide gases, and disulfide oil are separated from the regenerated caustic. The regenerated caustic is pumped to the C3/C4 extractor. Regenerated caustic with any residual disulfides is washed with NG in the NG wash settler.

C3/C4 Dehydration Section

Propane or butane products (or both) contain water when they leave MEROX treating. Dehydration removes moisture in such products through adsorption before the products flow to refrigeration and storage. The dehydration processes for C3 and C4 are similar. Both C3/C4 dehydration sections have two de-hydrators containing molecular sieve desiccant beds. One de-hydrator is in service while the other undergoes regeneration. Regeneration consists of heating the sieve beds to remove moisture, then cooling the beds before reuse. During drying, product flows up and through the molecular sieve bed, which adsorbs (that is, binds to its surface) moisture. From the top of the de-hydrator, dry C3/C4 products flow to refrigeration.

Natural Gasoline (NG) Processing Section

NG processing includes RVP control, de-colorizing and de-pentanizing sections.

RVP Control Section

A Reid vapor pressure (RVP) control section (or rerun unit) is a fractionator column that receives the C5+NG from the debutanizer bottom. The RVP control section collects a pentane product. The RVP control section can be used to adjust the RVP of the pentane product at a rerun fractionator overhead before the pentane product is sent to a pentane storage tank. RVP is a measure of the ability of a hydrocarbon to vaporize. RVP (sometimes called volatility) is an important specification in gasoline blending. The RVP control section stabilizes the RVP of NG by removing small amounts of pentane. Depending on operational requirements, the RVP control section can be totally or partially bypassed. NG from the debutanizer bottoms goes to the RVP column where a controlled amount of pentane is stripped and leaves the column as overhead gas. As in NGL fractionation, the overhead gas is condensed with coolers, and some of the condensate is pumped back to the column as reflux. The remaining pentane is cooled and sent to storage. If the RVP column bottoms product (NG) meets color specifications, it is sent to storage. If not, it is sent to decolorizing.

De-Colorizing Section

The de-colorizing section removes color bodies from NG. Color bodies are traces of heavy ends found in the debutanizer bottoms product. Other impurities such as corrosion products from the pipeline may also be present. These must be removed for NG to meet the color specification. De-colorizer feed can be RVP column bottoms product or de-butanizer bottoms product, or a combination of both. Additional natural gasoline can also be supplied from other facilities to maintain a hexane plus (C6+) product supply. If de-colorizing is needed, NG first passes through a pre-flash-drum. A large portion of the lighter NG components vaporizes and leaves the drum as overhead. The heavier NG components remain along with the color bodies and are fed to the de-colorizer column, where the remaining color bodies are separated. The NG leaves the de-colorizer as overhead gas and is condensed and collected in the NG product drum, with some pumped back to the column as reflux. Overhead from the column and flash drum are joined and pumped to either the de-pentanizer (described later) or cooled and sent to storage in the feed product surge unit. The color bodies leave the de-colorizer as bottoms product and are pumped to the feed and surge unit to be injected into a crude line.

De-Pentanizing Section

De-pentanizing uses a fractionation column to produce a pentane overhead product and a C6+ bottoms product. Both the pentane product and the C6+ bottoms product are separately fed to storage or downstream the petrochemical plants. The feed to the de-pentanizer is the NG product stream from the de-colorizing section. Feed can be increased or decreased based on the demand for C6+ bottoms product. If the NGL fractionation plant NG production cannot meet demand, NG can be imported from oil refineries. The de-colorized NG is preheated before entering the de-pentanizer. The separated pentane leaves the column as overhead gas. The overhead condensers cool the overhead stream, and some is pumped back to the column as reflux. The remaining pentane is cooled and sent to storage. Light NG in the bottoms is vaporized and returned to heat the de-pentanizer. The remaining bottoms product is cooled and sent to storage as C6+.

Table 2 lists duty per train of major waste heat streams in an example of an NGL fractionation plant.

TABLE 2

| Stream Name | Duty/train (MMBtu/h) |
|---|---|
| Propane refrigerant condenser | 94 |
| Propane de-hydration condenser | 22 |
| Butane de-hydrator condenser | 9 |
| Naphtha cooler | 11 |
| De-pentanizer condenser | 100 |
| ADIP cooler | 73 |
| Regenerator OVHD condenser | 18 |
| NG flash vapor condenser | 107 |
| NG de-colorizer condenser | 53 |
| Natural gasoline (cooling) process propane condenser | 29 |
| Fractionation propane condenser | 81 |
| Air cooled condenser | 16 |
| Regeneration gas cooler | 22 |
| RVP column condenser | 36 |
| Butane condenser | 49 |
| De-propanizer condenser | 194 |
| De-butanizer condenser | 115 |

In Table 2, "Duty/train" represents each stream's thermal duty in millions Btu per hour (MMBtu/h) per processing train. A typical NGL fractionation plant includes three to four processing trains.

The systems described in this disclosure can be integrated with a NGL fractionation plant to make the fractionation plant more energy efficient or less polluting or both. In particular, the energy conversion system can be implemented to recover low grade waste heat from the NGL fractionation plant. Low grade waste heat is characterized by a temperature difference between a source and sink of the low grade heat steam being between 65° C. and 232° C. (150° F. and 450° F.). The NGL fractionation plant is an attractive option for integration with energy conversion systems due to a large amount of low grade waste heat generated by the plant and an absence of a need for deep cooling. Deep cooling refers to a temperature that is less than ambient that uses a refrigeration cycle to maintain.

The low grade waste heat from an NGL fractionation plant can be used for commodities such as carbon-free power generation, cooling capacity generation, potable water production from sea water, or combinations thereof. Low grade waste heat is characterized by a temperature ranging between 65° C. and 232° C. (150° F. to 450° F.). The waste heat can be used for the mono-generation, co-generation, or tri-generation of one or more or all of the commodities mentioned earlier. Low grade waste heat from the NGL fractionation plant can be used to provide in-plant sub-ambient cooling, thus reducing the consumption of power or fuel (or both) of the plant. Low grade waste heat from the NGL fractionation plant can be used to provide ambient air conditioning or cooling in the industrial community or in a nearby non-industrial community, thus helping the community to consume energy from alternative sources. In addition, the low grade waste heat can be used to desalinate water and produce potable water to the plant and adjacent community. An NGL fractionation plant is selected for low grade waste heat recovery because of a quantity of low grade waste heat available from the NGL fractionation plant as well as a cooling requirement of the plant to ambient temperature cooling (instead of deep cooling).

The energy conversion systems described in this disclosure can be integrated into an existing NGL fractionation plant as a retrofit or can be part of a newly constructed NGL fractionation plant. A retrofit to an existing NGL fractionation plant allows the carbon-free power generation, and fuel savings advantages offered by the energy conversion systems described here to be accessible with a reduced capital investment. For example, the energy conversion systems described here can produce one or more or all of substantially between 35 MW and 40 MW (for example, 37 MW) of carbon-free power, substantially between 100,000 and 150,000 $m^3$/day (for example, 120,000 $m^3$/day) of desalinated water, and substantially between 350 MM BTU/h and 400 MM BTU/h (for example, 388 MM BTU/h) of cooling capacity for in-plant or community utilization or both.

As described later, the systems for waste heat recovery and re-use from the NGL fractionation plant can include modified multi-effect distillation (MED) systems, customized Organic Rankine Cycle (ORC) systems, unique ammonia-water mixture Kalina cycle systems, customized modified Goswami cycle systems, mono-refrigerant specific vapor compression-ejector-expander triple cycle systems, or combinations of one or more of them. Details of each disclosure are described in the following paragraphs.

Heat Exchangers

In the configurations described in this disclosure, heat exchangers are used to transfer heat from one medium (for example, a stream flowing through a plant in a NGL fractionation plant, a buffer fluid or such medium) to another medium (for example, a buffer fluid or different stream flowing through a plant in the NGL fractionation plant). Heat exchangers are devices which transfer (exchange) heat typically from a hotter fluid stream to a relatively less hotter fluid stream. Heat exchangers can be used in heating and cooling applications, for example, in refrigerators, air conditions or such cooling applications. Heat exchangers can be distinguished from one another based on the direction in which fluids flow. For example, heat exchangers can be parallel-flow, cross-flow or counter-current. In parallel-flow heat exchangers, both fluid involved move in the same direction, entering and exiting the heat exchanger side-by-side. In cross-flow heat exchangers, the fluid path runs perpendicular to one another. In counter-current heat exchangers, the fluid paths flow in opposite directions, with one fluid exiting whether the other fluid enters. Counter-current heat exchangers are sometimes more effective than the other types of heat exchangers.

In addition to classifying heat exchangers based on fluid direction, heat exchangers can also be classified based on their construction. Some heat exchangers are constructed of multiple tubes. Some heat exchangers include plates with room for fluid to flow in between. Some heat exchangers enable heat exchange from liquid to liquid, while some heat exchangers enable heat exchange using other media.

Heat exchangers in a NGL fractionation plant are often shell and tube type heat exchangers which include multiple tubes through which fluid flows. The tubes are divided into two sets—the first set contains the fluid to be heated or cooled; the second set contains the fluid responsible for triggering the heat exchange, in other words, the fluid that either removes heat from the first set of tubes by absorbing and transmitting the heat away or warms the first set by transmitting its own heat to the fluid inside. When designing this type of exchanger, care must be taken in determining the correct tube wall thickness as well as tube diameter, to allow optimum heat exchange. In terms of flow, shell and tube heat exchangers can assume any of three flow path patterns.

Heat exchangers in NGL facilities can also be plate and frame type heat exchangers. Plate heat exchangers include thin plates joined together with a small amount of space in between, often maintained by a rubber gasket. The surface area is large, and the corners of each rectangular plate feature an opening through which fluid can flow between plates, extracting heat from the plates as it flows. The fluid channels themselves alternate hot and cold liquids, meaning that the heat exchangers can effectively cool as well as heat fluid. Because plate heat exchangers have large surface area, they can sometimes be more effective than shell and tube heat exchangers.

Other types of heat exchangers can include regenerative heat exchangers and adiabatic wheel heat exchangers. In a regenerative heat exchanger, the same fluid is passed along both sides of the exchanger, which can be either a plate heat exchanger or a shell and tube heat exchanger. Because the fluid can get very hot, the exiting fluid is used to warm the incoming fluid, maintaining a near constant temperature. Energy is saved in a regenerative heat exchanger because the process is cyclical, with almost all relative heat being transferred from the exiting fluid to the incoming fluid. To maintain a constant temperature, a small quantity of extra energy is needed to raise and lower the overall fluid temperature. In the adiabatic wheel heat exchanger, an intermediate liquid is used to store heat, which is then transferred to the opposite side of the heat exchanger. An adiabatic wheel consists of a large wheel with threads that rotate through the liquids—both hot and cold—to extract or transfer heat. The heat exchangers described in this disclosure can include any one of the heat exchangers described earlier, other heat exchangers, or combinations of them.

Each heat exchanger in each configuration can be associated with a respective thermal duty (or heat duty). The thermal duty of a heat exchanger can be defined as an amount of heat that can be transferred by the heat exchanger from the hot stream to the cold stream. The amount of heat can be calculated from the conditions and thermal properties of both the hot and cold streams. From the hot stream point of view, the thermal duty of the heat exchanger is the product of the hot stream flow rate, the hot stream specific heat, and a difference in temperature between the hot stream inlet temperature to the heat exchanger and the hot stream outlet temperature from the heat exchanger. From the cold stream point of view, the thermal duty of the heat exchanger is the product of the cold stream flow rate, the cold stream specific heat and a difference in temperature between the cold stream outlet from the heat exchanger and the cold stream inlet temperature from the heat exchanger. In several applications, the two quantities can be considered equal assuming no heat loss to the environment for these units, particularly, where the units are well insulated. The thermal duty of a heat exchanger can be measured in watts (W), megawatts (MW), millions of British Thermal Units per hour (Btu/hr), or millions of kilocalories per hour (Kcal/h). In the configurations described here, the thermal duties of the heat exchangers are provided as being "about X MW," where "X" represents a numerical thermal duty value. The numerical thermal duty value is not absolute. That is, the actual thermal duty of a heat exchanger can be approximately equal to X, greater than X or less than X.

Flow Control System

In each of the configurations described later, process streams (also called "streams") are flowed within each plant in a NGL fractionation plant and between plants in the NGL fractionation plant. The process streams can be flowed using one or more flow control systems implemented throughout the NGL fractionation plant. A flow control system can include one or more flow pumps to pump the process streams, one or more flow pipes through which the process streams are flowed and one or more valves to regulate the flow of streams through the pipes.

In some implementations, a flow control system can be operated manually. For example, an operator can set a flow rate for each pump and set valve open or close positions to regulate the flow of the process streams through the pipes in the flow control system. Once the operator has set the flow rates and the valve open or close positions for all flow control systems distributed across the NGL fractionation plant, the flow control system can flow the streams within a plant or between plants under constant flow conditions, for example, constant volumetric rate or other flow conditions. To change the flow conditions, the operator can manually operate the flow control system, for example, by changing the pump flow rate or the valve open or close position.

In some implementations, a flow control system can be operated automatically. For example, the flow control system can be connected to a computer system to operate the flow control system. The computer system can include a computer-readable medium storing instructions (such as flow control instructions and such instructions) executable by one or more processors to perform operations (such as flow control operations). An operator can set the flow rates and the valve open or close positions for all flow control systems distributed across the NGL fractionation plant using the computer system. In such implementations, the operator can manually change the flow conditions by providing inputs through the computer system. Also, in such implementations, the computer system can automatically (that is, without manual intervention) control one or more of the flow control systems, for example, using feedback systems implemented in one or more plants and connected to the computer system. For example, a sensor (such as a pressure sensor, temperature sensor or other sensor) can be connected to a pipe through which a process stream flows. The sensor can monitor and provide a flow condition (such as a pressure, temperature, or other flow condition) of the process stream to the computer system. In response to the flow condition exceeding a threshold (such as a threshold pressure value, a threshold temperature value, or other threshold value), the computer system can automatically perform operations. For example, if the pressure or temperature in the pipe exceeds the threshold pressure value or the threshold temperature value, respectively, the computer system can provide a signal to the pump to decrease a flow rate, a signal to open a valve to relieve the pressure, a signal to shut down process stream flow, or other signals.

In some implementations, the techniques described here can be implemented using a waste heat recovery network that includes 18 heat exchanger units distributed in specific areas in the NGL fractionation plant and a utility Plant to heat high pressure buffer streams. In some implementations, a $1^{st}$ buffer stream is hot oil. The heated oil is used for generating power using a customized Kalina Cycle. In some implementations, a $2^{nd}$ buffer stream is high pressure water. The heated water is used to generate potable water from salt water using a MED system. The Kalina Cycle is coupled to 17 of the 18 heat exchanger units in the network and that uses the $1^{St}$ buffer stream. The MED system is coupled to the $18^{th}$ heat exchanger unit and uses the $2^{nd}$ buffer stream. In some implementations, the heat recovered from the streams of the NGL fractionation plant can be used to operate the Kalina Cycle alone or the MED system alone. In some implementations, the heat can be used to operate both the Kalina Cycle and the MED system. In some implementations, the first and second buffer streams include the same fluid, and are stored and flow from the same storage tank/storage unit.

The techniques can be implemented to increase the temperature of the $1^{st}$ buffer fluid from a temperature of between 115° F. and 125° F. (for example, about 120° F.) to a temperature between 170° F. and 180° F. (for example, about 176° F.). The $1^{st}$ buffer fluid stream is then used to drive a customized Kalina cycle system to produce between 35 MW and 40 MW (for example, 34.3 MW) of power. The $1^{st}$ buffer fluid stream temperature is reduced in the Kalina cycle system to between 115° F. and 125° F. (for example, 120° F.), and the stream is flowed back to the $1^{st}$ buffer fluid storage tank 1105. The techniques can be implemented to increase the temperature of the $2^{nd}$ buffer fluid from a temperature of between 115° F. and 125° F. (for example, about 120° F.) to a temperature between 130° F. and 140° F. (for example, about 136° F.). The heated $2^{nd}$ buffer fluid stream is then used to drive a modified MED system to produce about 23,000 m³/day of potable water. The hot $2^{nd}$ buffer fluid stream temperature is reduced in the MED system to between 115° F. and 125° F. (for example, 120° F.), and the stream is flowed back to the $2^{nd}$ buffer fluid storage tank 1109.

FIG. 1A is a schematic diagram of an example of a low grade waste heat recovery system. The schematic includes a storage tank 1105 to store buffer fluid of a $1^{st}$ type, for example, oil, pressurized water, or other buffer fluid. The schematic also includes a storage tank 1109 to store buffer fluid of a $2^{nd}$ type, for example, pressurized water, oil, or such buffer fluid. The buffer fluid from the first buffer fluid storage tank 1105 and the second buffer fluid storage tank 1109 are flowed to a heat exchanger network 1107 which, in some implementations, can include 18 heat exchangers (for example, heat exchangers 11a, 11b, 11c, 11d, 11e, 11f, 11g, 11h, 11i, 11j, 11k, 11l, 11m, 11n, 11o, 11p, 11q, 11r), which are described in detail later. The buffer fluids are flowed through the heat exchanger network 1107 and heated by streams in the NGL fractionation plant (described later). As described later, the heated buffer fluid from the storage tank 1105 is used to generate power in a Kalina cycle system 1111, and the heated buffer fluid from the storage tank 1109 is used to generate potable water in a modified MED system 1113. The buffer fluids are then returned to their respective storage tanks. In some implementations, the waste heat recovery system can be implemented to include either only the Kalina cycle system 1111 or the modified MED system 1113. In some implementations, a single storage tank can be used in place of the storage tank 1105 and the storage tank 1109.

Figure 1B:
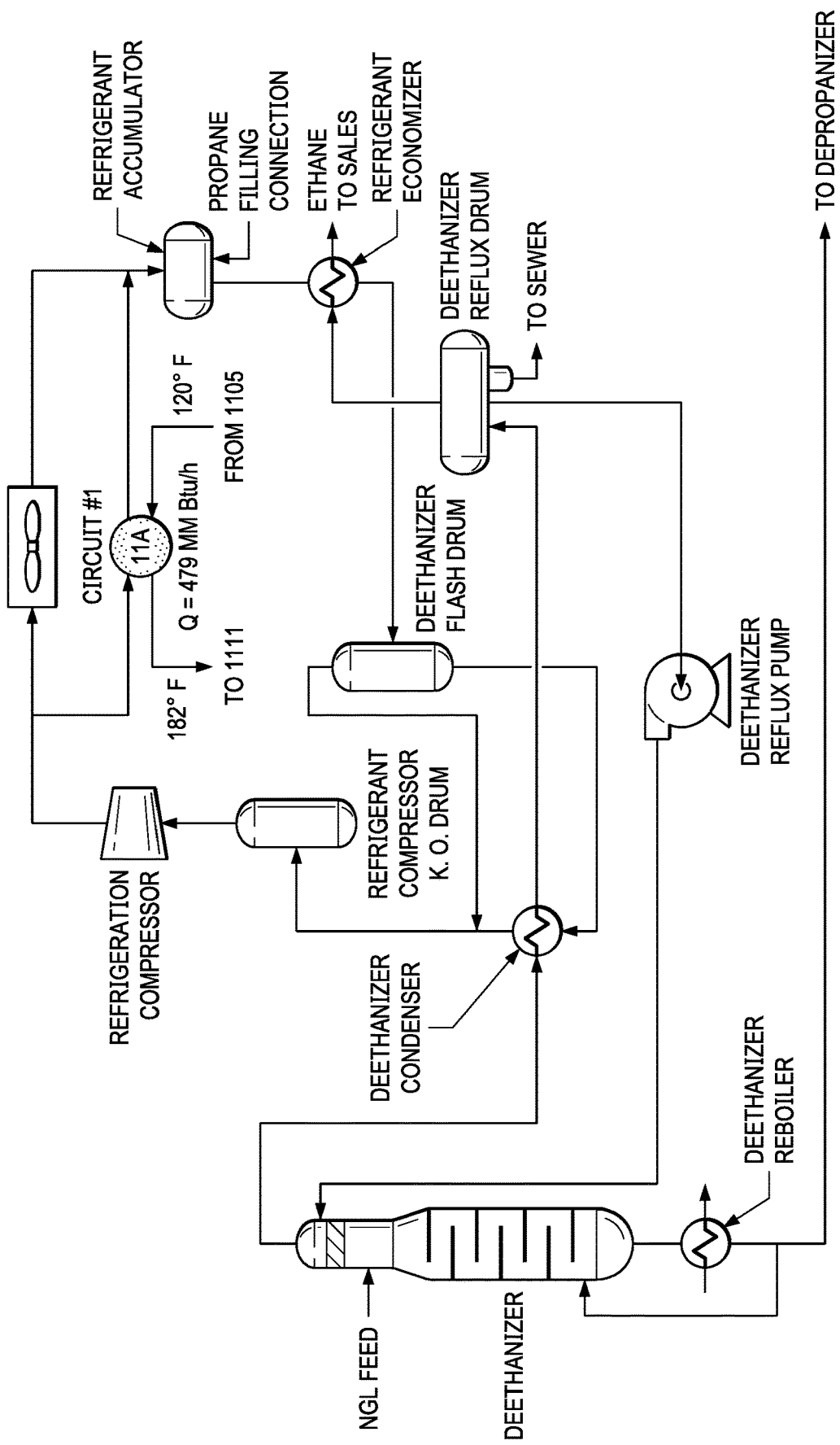
FIG. 1B is a schematic diagram of a de-ethanizer section waste heat recovery system in a NGL fractionation plant.

FIG. 1B is a schematic diagram of a de-ethanizer section waste heat recovery system in the NGL fractionation plant. A $1^{st}$ heat exchanger 11a is located in the de-ethanizer section of the NGL fractionation plant. In some implementations, the buffer fluid in the storage tank 1105 is hot oil at a temperature of between 115° F. and 125° F. (for example, 120° F.). The hot oil stream flows from the storage tank 1105 to the $1^{st}$ heat exchanger 11a to cool down the de-ethanizer refrigeration compressor outlet stream. In turn, the temperature of the hot oil stream increases to between 175° F. and 185° F. (for example, 182° F.). The heated oil stream flows to the collection header to join other hot oil streams to flow to the Kalina cycle system 1111. The total thermal duty of the $1^{st}$ heat exchanger 11a is between 475 MM Btu/h and 485 MM Btu/h (for example, about 479 MM Btu/h).

Figure 1C:
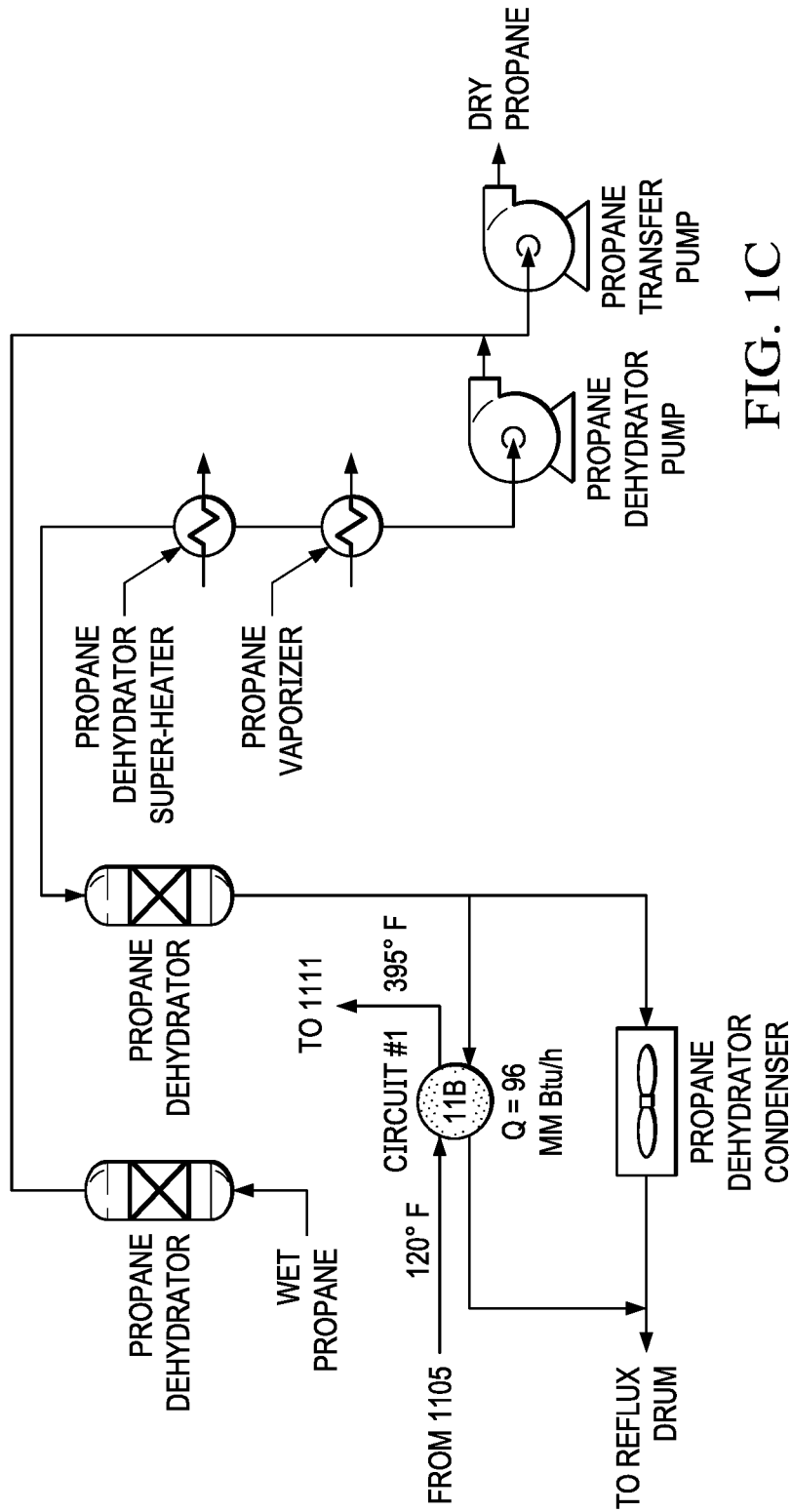
FIG. 1C is a schematic diagram of a propane de-hydrator section waste heat recovery system in a NGL fractionation plant.

FIG. 1C is a schematic diagram of a propane de-hydrator section waste heat recovery system in the NGL fractionation plant. A $2^{nd}$ heat exchanger 11b is located in the propane de-hydrator section of the NGL fractionation plant. In some implementations, the hot oil flows from the storage tank 1105 to the $2^{nd}$ heat exchanger 11b to cool down the propane de-hydrator outlet stream. In turn, the temperature of the hot oil stream increases to between 385° F. and 395° F. (for example, 390° F.). The heated oil stream flows to the collection header to join other hot oil streams to flow to the Kalina cycle system 1111. The total thermal duty of the $2^{nd}$ heat exchanger 11b is between 90 MM Btu/h and 100 MM Btu/h (for example, about 96 MM Btu/h).

Figure 1D:
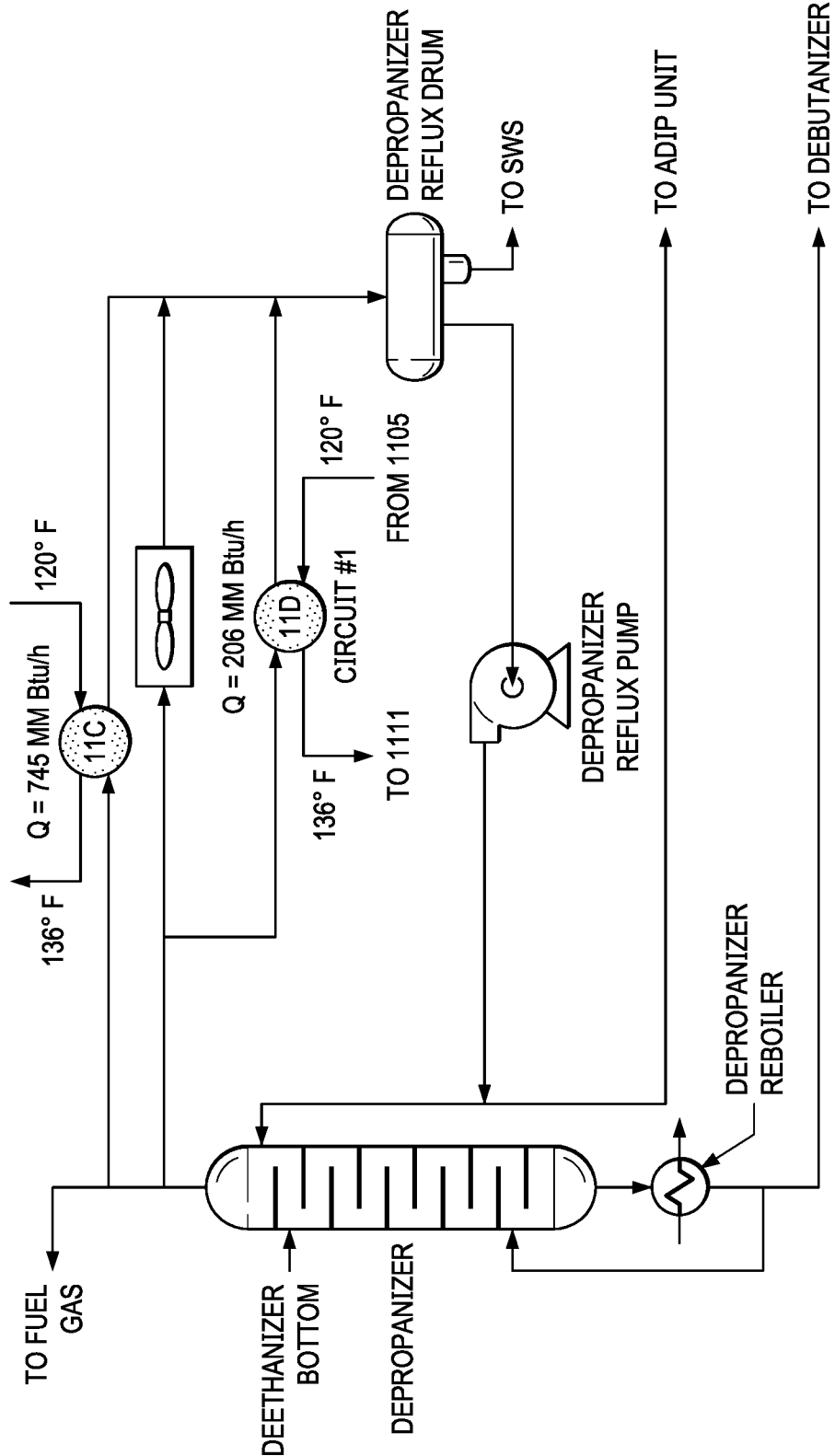
FIG. 1D is a schematic diagram of a de-propanizer section waste heat recovery system in a NGL fractionation plant.

FIG. 1D is a schematic diagram of a de-propanizer section waste heat recovery system in the NGL fractionation plant. A $3^{rd}$ heat exchanger 11c is located in the de-propanizer section of the NGL fractionation plant. In some implementations, the buffer fluid in the storage tank 1109 is pressurized water at a temperature of between 115° F. and 125° F. (for example, 120° F.). The pressurized water flows from the storage tank 1109 to the $3^{rd}$ heat exchanger 11c to cool down the de-propanizer overhead outlet stream. In turn, the temperature of the pressurized water stream increases to between 130° F. and 140° F. (for example, 136° F.). The heated pressurized water stream is flowed to the first train of the MED system 1113 (described later). The total thermal duty of the $3^{rd}$ heat exchanger 11c is between 740 MM Btu/h and 750 MM Btu/h (for example, about 745 MM Btu/h).

A $4^{th}$ heat exchanger 11d is located in the de-propanizer section of the NGL fractionation plant. In some implementations, the hot oil flows from the storage tank 1105 to the $4^{th}$ heat exchanger 11d to cool down the de-propanizer overhead outlet stream. In turn, the temperature of the hot oil stream increases to between 130° F. and 140° F. (for example, 136° F.). The heated oil stream flows to the collection header to join other hot oil streams to flow to the Kalina cycle system 1111. The total thermal duty of the $4^{th}$ heat exchanger 11d is between 200 MM Btu/h and 210 MM Btu/h (for example, about 206 MM Btu/h).

Figure 1E:
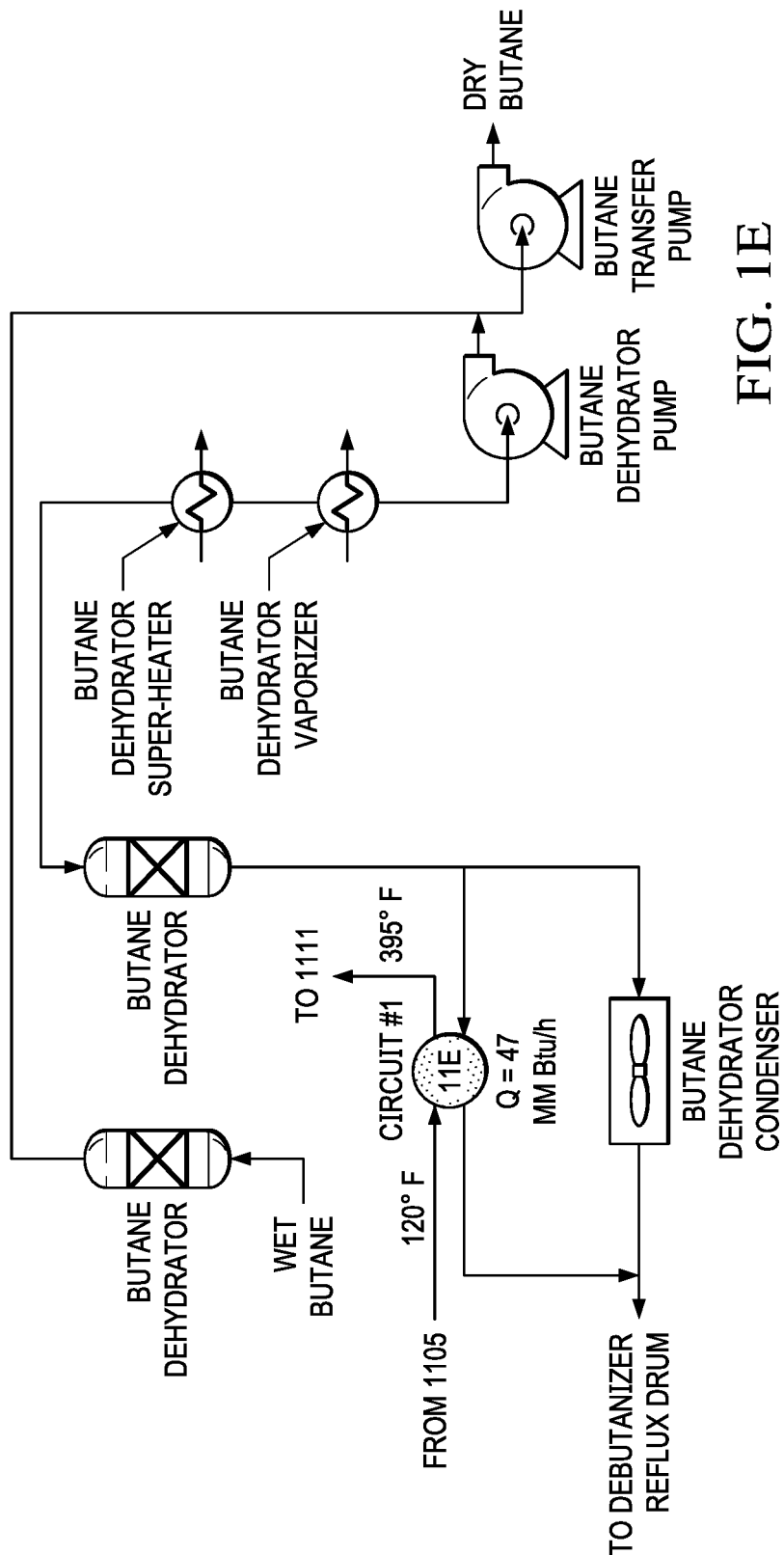
FIG. 1E is a schematic diagram of a butane de-hydrator section waste heat recovery system in a NGL fractionation plant.

FIG. 1E is a schematic diagram of a butane de-hydrator section waste heat recovery system in the NGL fractionation plant. A $5^{th}$ heat exchanger 11e is located in the butane de-hydrator section of the NGL fractionation plant. In some implementations, the hot oil flows from the storage tank 1105 to the $5^{th}$ heat exchanger 11e to cool down the butane de-hydrator outlet stream. In turn, the temperature of the hot oil stream increases to between 385° F. and 395° F. (for example, 390° F.). The heated oil stream flows to the collection header to join other hot oil streams to flow to the Kalina cycle system 1111. The total thermal duty of the $5^{th}$ heat exchanger 11e is between 40 MM Btu/h and 50 MM Btu/h (for example, about 47 MM Btu/h).

Figure 1F:
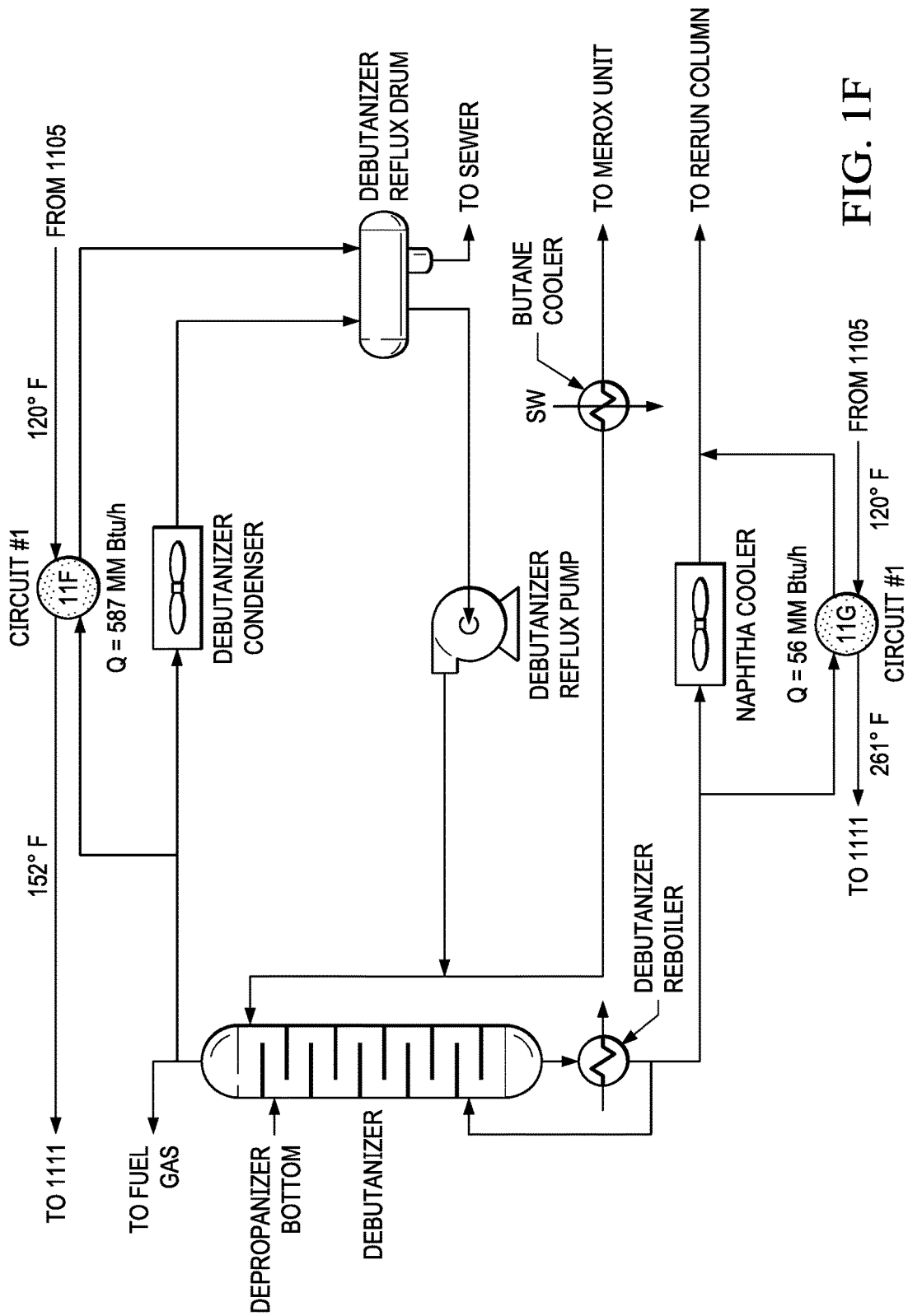
FIG. 1F is a schematic diagram of a de-butanizer section waste heat recovery system in a NGL fractionation plant.

FIG. 1F is a schematic diagram of a de-butanizer section waste heat recovery system in the NGL fractionation plant. A $6^{th}$ heat exchanger 11f is located in the de-butanizer section of the NGL fractionation plant. In some implementations, the hot oil flows from the storage tank 1105 to the $6^{th}$ heat exchanger 11f to cool down the de-butanizer overhead outlet stream. In turn, the temperature of the hot oil stream increases to between 150° F. and 160° F. (for example, 152° F.). The heated oil stream flows to the collection header to join other hot oil streams to flow to the Kalina cycle system 1111. The total thermal duty of the $6^{th}$ heat exchanger 11f is between 580 MM Btu/h and 590 MM Btu/h (for example, about 587 MM Btu/h).

A $7^{th}$ heat exchanger 11g is located in the de-butanizer section of the NGL fractionation plant. In some implementations, the hot oil flows from the storage tank 1105 to the $7^{th}$ heat exchanger 11g to cool down the de-butanizer bottoms outlet stream. In turn, the temperature of the hot oil stream increases to between 255° F. and 265° F. (for example, 261° F.). The heated oil stream flows to the collection header to join other hot oil streams to flow to the Kalina cycle system 1111. The total thermal duty of the $7^{th}$ heat exchanger 11g is between 50 MM Btu/h and 60 MM Btu/h (for example, about 56 MM Btu/h).

Figure 1G:
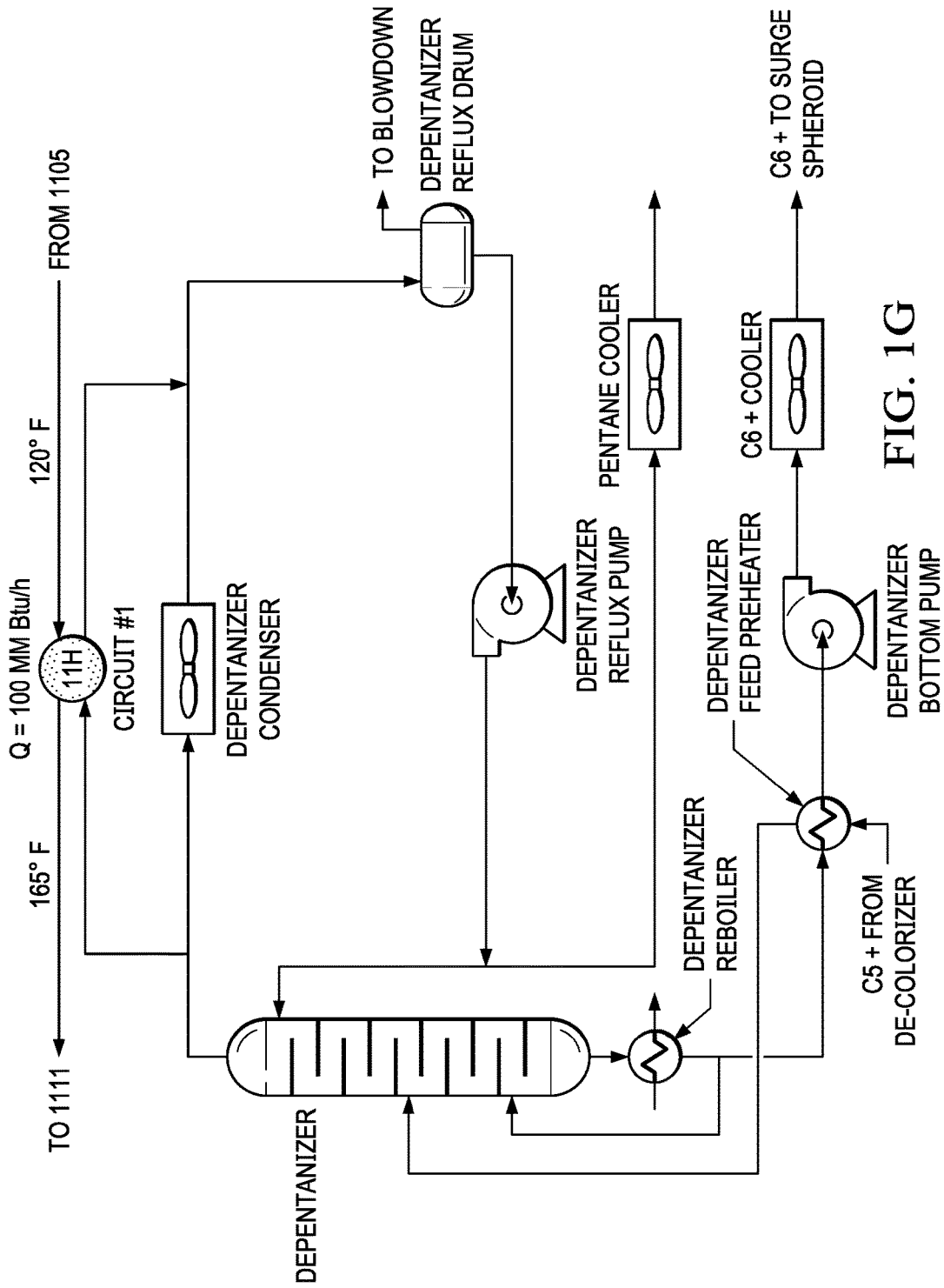
FIG. 1G is a schematic diagram of a de-pentanizer section waste heat recovery system in a NGL fractionation plant.

FIG. 1G is a schematic diagram of a de-pentanizer section waste heat recovery system in the NGL fractionation plant. An $8^{th}$ heat exchanger 11h is located in the de-pentanizer section of the NGL fractionation plant. In some implementations, the hot oil flows from the storage tank 1105 to the $8^{th}$ heat exchanger 11h to cool down the de-pentanizer overhead outlet stream. In turn, the temperature of the hot oil stream increases to between 160° F. and 170° F. (for example, 165° F.). The heated oil stream flows to the collection header to join other hot oil streams to flow to the Kalina cycle system 1111. The total thermal duty of the $8^{th}$ heat exchanger 11h is between 95 MM Btu/h and 105 MM Btu/h (for example, about 100 MM Btu/h).

Figure 1H:
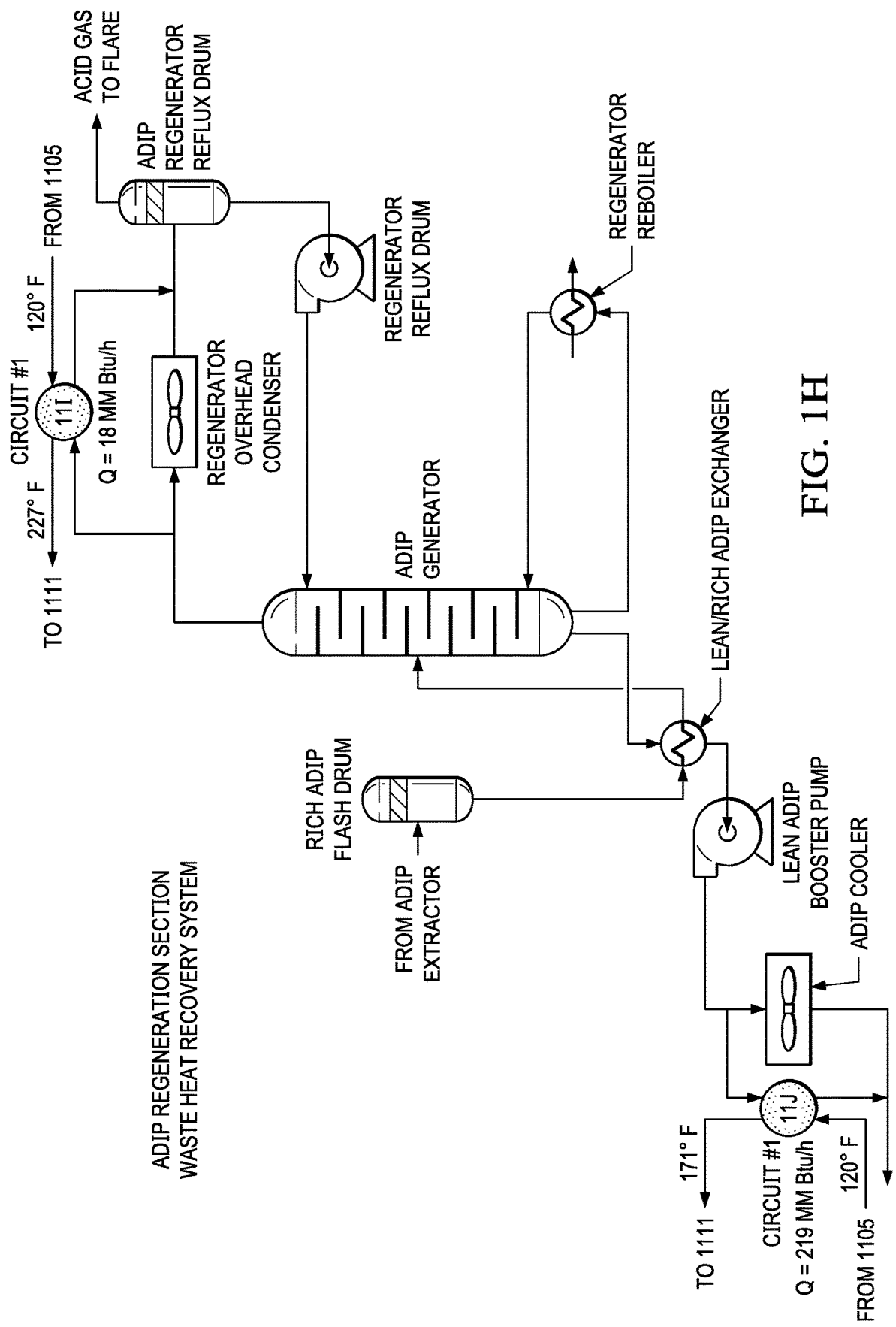
FIG. 1H is a schematic diagram of an ADIP regeneration section waste heat recovery system in a NGL fractionation plant.

FIG. 1H is a schematic diagram of an ADIP regeneration section waste heat recovery system in the NGL fractionation plant. A $9^{th}$ heat exchanger 11i is located in the ADIP regeneration section of the NGL fractionation plant. In some implementations, the hot oil flows from the storage tank 1105 to the $9^{th}$ heat exchanger 11i to cool down the ADIP regeneration section overhead outlet stream. In turn, the temperature of the hot oil stream increases to between 220° F. and 230° F. (for example, 227° F.). The heated oil stream flows to the collection header to join other hot oil streams to flow to the Kalina cycle system 1111. The total thermal duty of the $9^{th}$ heat exchanger 11i is between 15 MM Btu/h and 25 MM Btu/h (for example, about 18 MM Btu/h).

A $10^{th}$ heat exchanger 11j is located in the ADIP regeneration section of the NGL fractionation plant. In some implementations, the hot oil flows from the storage tank 1105 to the $10^{th}$ heat exchanger 11j to cool down the ADIP regeneration section bottoms outlet stream. In turn, the temperature of the hot oil stream increases to between 165° F. and 175° F. (for example, 171° F.). The heated oil stream flows to the collection header to join other hot oil streams to flow to the Kalina cycle system 1111. The total thermal duty of the $10^{th}$ heat exchanger 11j is between 215 MM Btu/h and 225 MM Btu/h (for example, about 219 MM Btu/h).

Figure 1I:
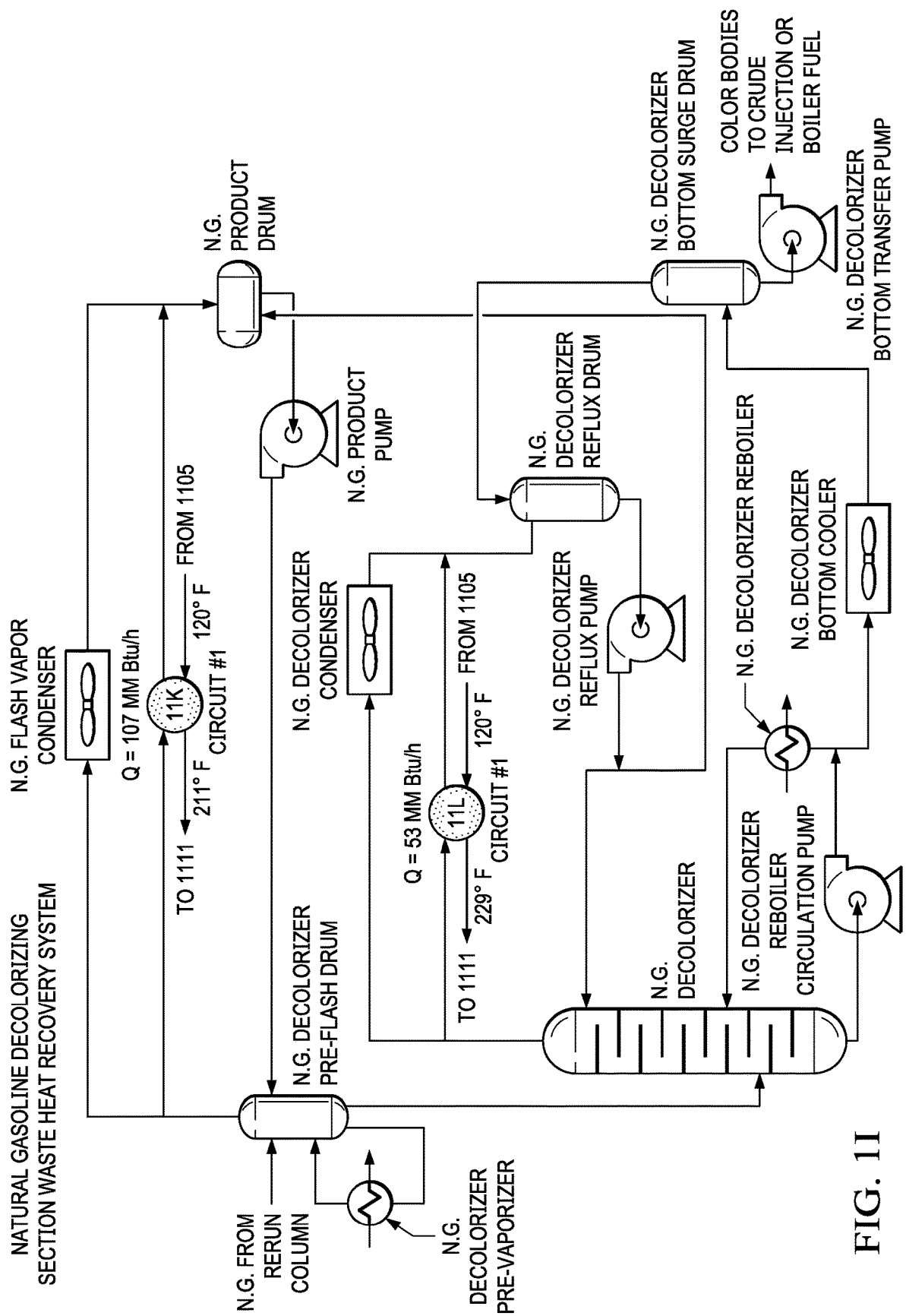
FIG. 1I is a schematic diagram of a natural gas de-colorizing section waste heat recovery system in a NGL fractionation plant.

FIG. 1I is a schematic diagram of a natural gas de-colorizing section waste heat recovery system in the NGL fractionation plant. An $11^{th}$ heat exchanger 11k is located in the natural gas de-colorizing section of the NGL fractionation plant. In some implementations, the hot oil flows from the storage tank 1105 to the $11^{th}$ heat exchanger 11k to cool down the natural gas de-colorizing section pre-flash drum overhead outlet stream. In turn, the temperature of the hot oil stream increases to between 205° F. and 215° F. (for example, 211° F.). The heated oil stream flows to the collection header to join other hot oil streams to flow to the Kalina cycle system 1111. The total thermal duty of the $11^{th}$ heat exchanger 11k is between 100 MM Btu/h and 110 MM Btu/h (for example, about 107 MM Btu/h).

A $12^{th}$ heat exchanger 11l is located in the natural gas de-colorizing section of the NGL fractionation plant. In some implementations, the hot oil flows from the storage tank 1105 to the $12^{th}$ heat exchanger 11l to cool down the natural gas de-colorizer overhead outlet stream. In turn, the temperature of the hot oil stream increases to between 225° F. and 235° F. (for example, 229° F.). The heated oil stream flows to the collection header to join other hot oil streams to flow to the Kalina cycle system 1111. The total thermal duty of the $12^{th}$ heat exchanger 11l is between 50 MM Btu/h and 60 MM Btu/h (for example, about 53 MM Btu/h).

Figure 1J:
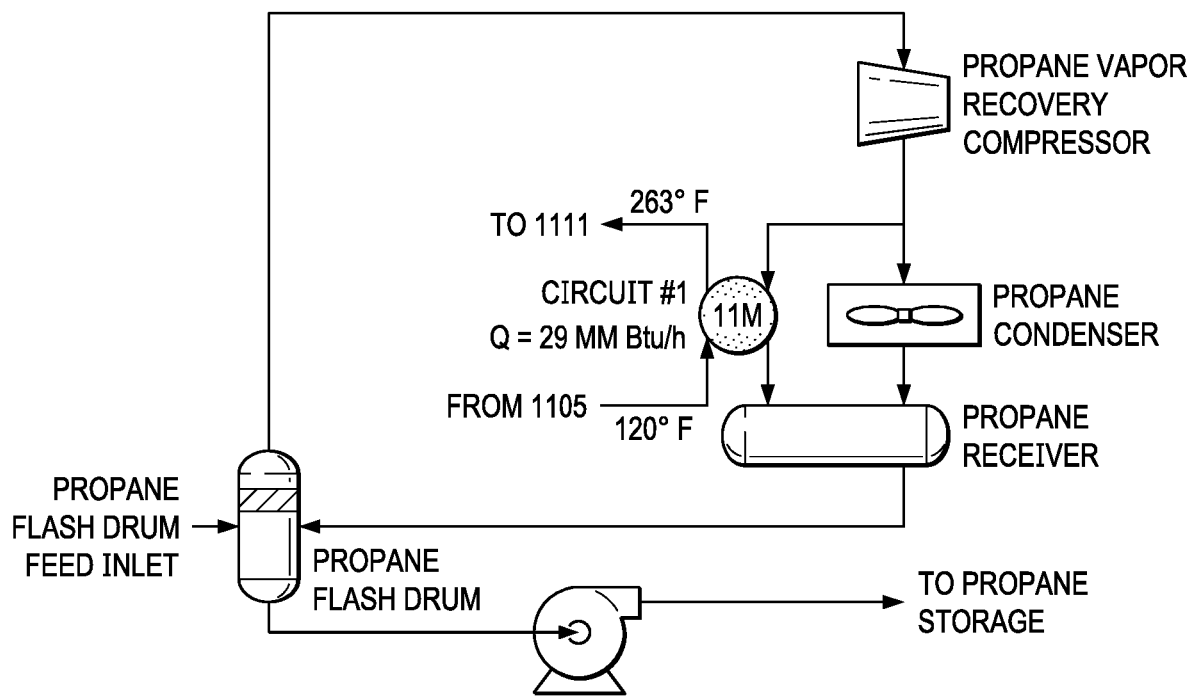
FIG. 1J is a schematic diagram of a propane tank vapor recovery section waste heat recovery system in a NGL fractionation plant.

FIG. 1J is a schematic diagram of a propane tank vapor recovery section waste heat recovery system in the NGL fractionation plant. A $13^{th}$ heat exchanger 11m is located in the propane tank vapor recovery section of the NGL fractionation plant. In some implementations, the hot oil flows from the storage tank 1105 to the $13^{th}$ heat exchanger 11m to cool down the propane vapor recovery compressor outlet stream. In turn, the temperature of the hot oil stream increases to between 255° F. and 265° F. (for example, 263° F.). The heated oil stream flows to the collection header to join other hot oil streams to flow to the Kalina cycle system 1111. The total thermal duty of the $13^{th}$ heat exchanger 11m is between 25 MM Btu/h and 35 MM Btu/h (for example, about 29 MM Btu/h).

Figure 1K:
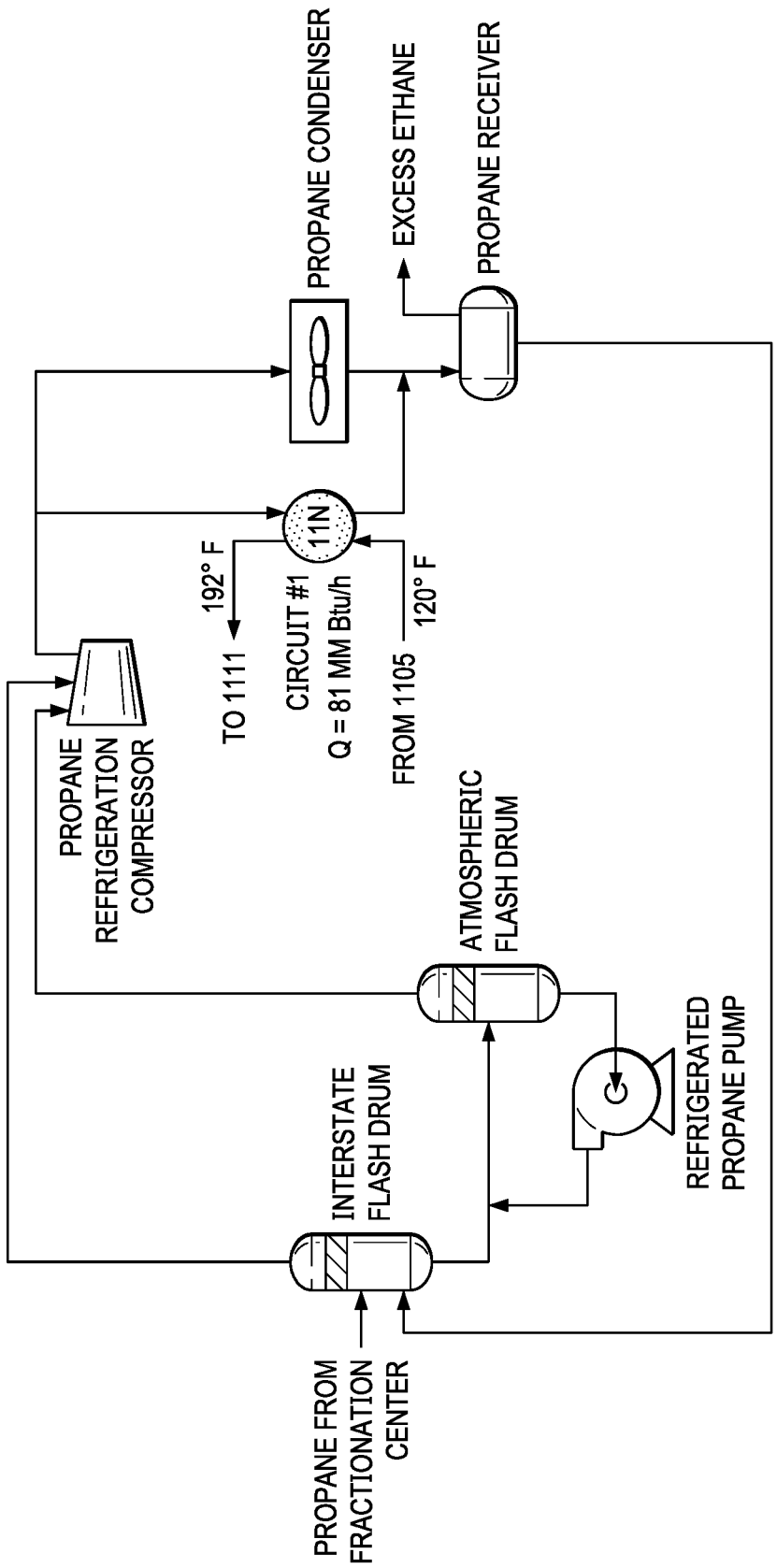
FIG. 1K is a schematic diagram of a propane product refrigeration section waste heat recovery system in a NGL fractionation plant.

FIG. 1K is a schematic diagram of a propane product refrigeration section waste heat recovery system in the NGL fractionation plant. A $14^{th}$ heat exchanger 11n is located in the propane product refrigeration section of the NGL fractionation plant. In some implementations, the hot oil flows from the storage tank 1105 to the $14^{th}$ heat exchanger 11n to cool down the propane refrigeration compressor outlet stream. In turn, the temperature of the hot oil stream increases to between 185° F. and 195° F. (for example, 192° F.). The heated oil stream flows to the collection header to join other hot oil streams to flow to the Kalina cycle system 1111. The total thermal duty of the $14^{th}$ heat exchanger 11n is between 75 MM Btu/h and 85 MM Btu/h (for example, about 81 MM Btu/h).

Figure 1L:
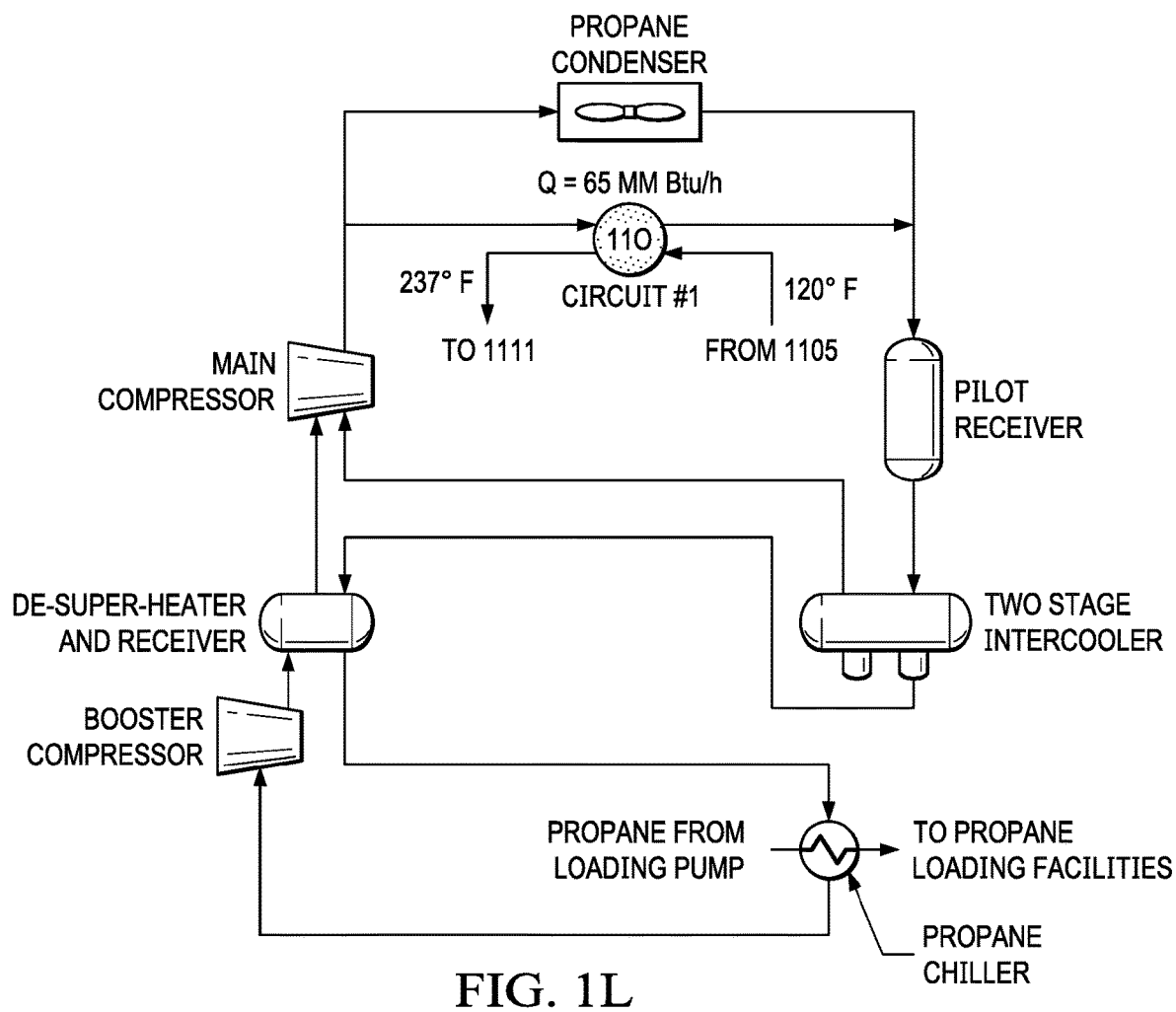
FIG. 1L is a schematic diagram of a propane product sub-cooling section waste heat recovery system in a NGL fractionation plant.

FIG. 1L is a schematic diagram of a propane product sub-cooling section waste heat recovery system in the NGL fractionation plant. A $15^{th}$ heat exchanger 11o is located in the propane product sub-cooling section of the NGL fractionation plant. In some implementations, the hot oil flows from the storage tank 1105 to the $15^{th}$ heat exchanger 11o to cool down the propane main compressor outlet stream. In turn, the temperature of the hot oil stream increases to between 235° F. and 245° F. (for example, 237° F.). The heated oil stream flows to the collection header to join other hot oil streams to flow to the Kalina cycle system 1111. The total thermal duty of the $15^{th}$ heat exchanger 11o is between 60 MM Btu/h and 70 MM Btu/h (for example, about 65 MM Btu/h).

Figure 1M:
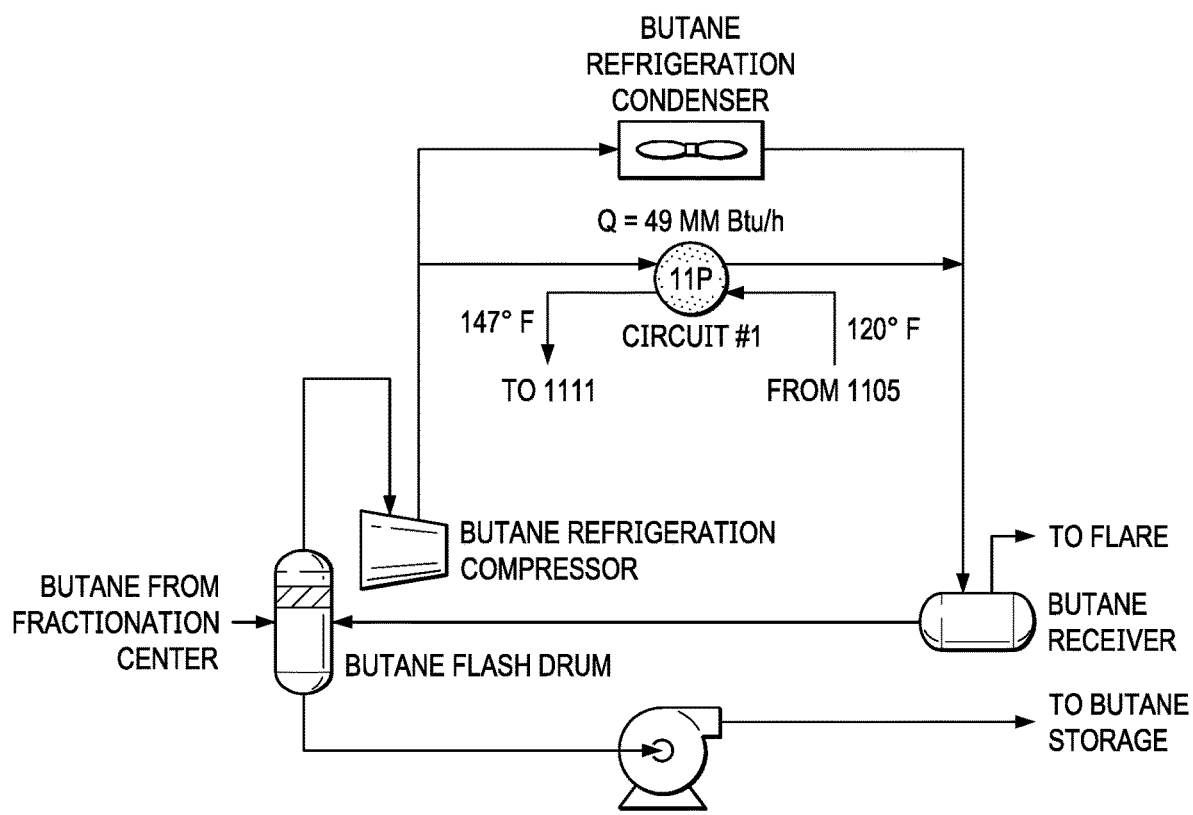
FIG. 1M is a schematic diagram of a butane product refrigeration section waste heat recovery system in a NGL fractionation plant.

FIG. 1M is a schematic diagram of a butane product refrigeration section waste heat recovery system in the NGL fractionation plant. A $16^{th}$ heat exchanger 11p is located in the butane product refrigeration section of the NGL fractionation plant. In some implementations, the hot oil flows from the storage tank 1105 to the $16^{th}$ heat exchanger 11p to cool down the butane refrigeration compressor outlet stream. In turn, the temperature of the hot oil stream increases to between 140° F. and 150° F. (for example, 147° F.). The heated oil stream flows to the collection header to join other hot oil streams to flow to the Kalina cycle system 1111. The total thermal duty of the $16^{th}$ heat exchanger 11p is between 45 MM Btu/h and 55 MM Btu/h (for example, about 49 MM Btu/h).

Figure 1N:
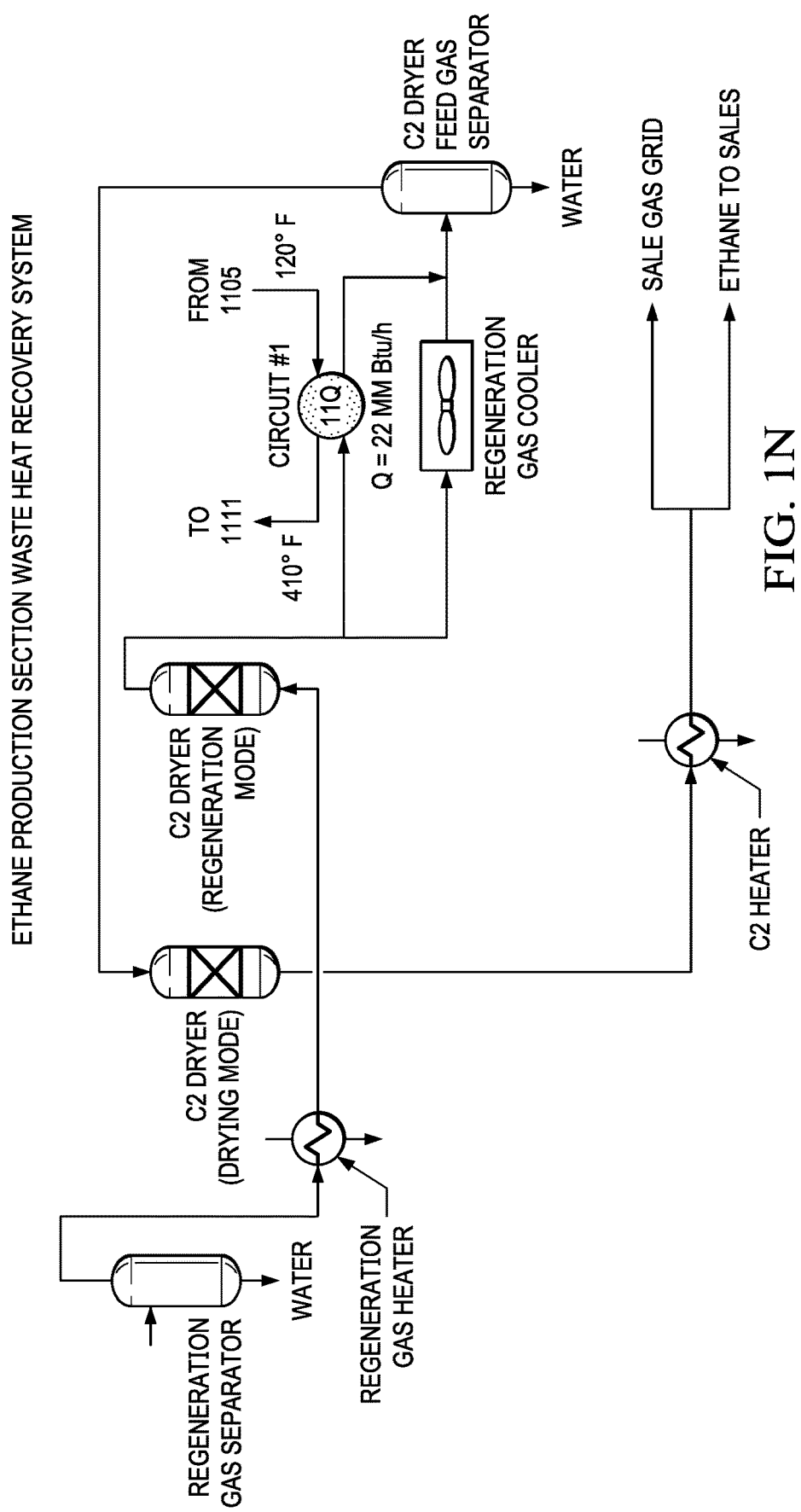
FIG. 1N is a schematic diagram of an ethane production section waste heat recovery system in a NGL fractionation plant.
Figure 10:
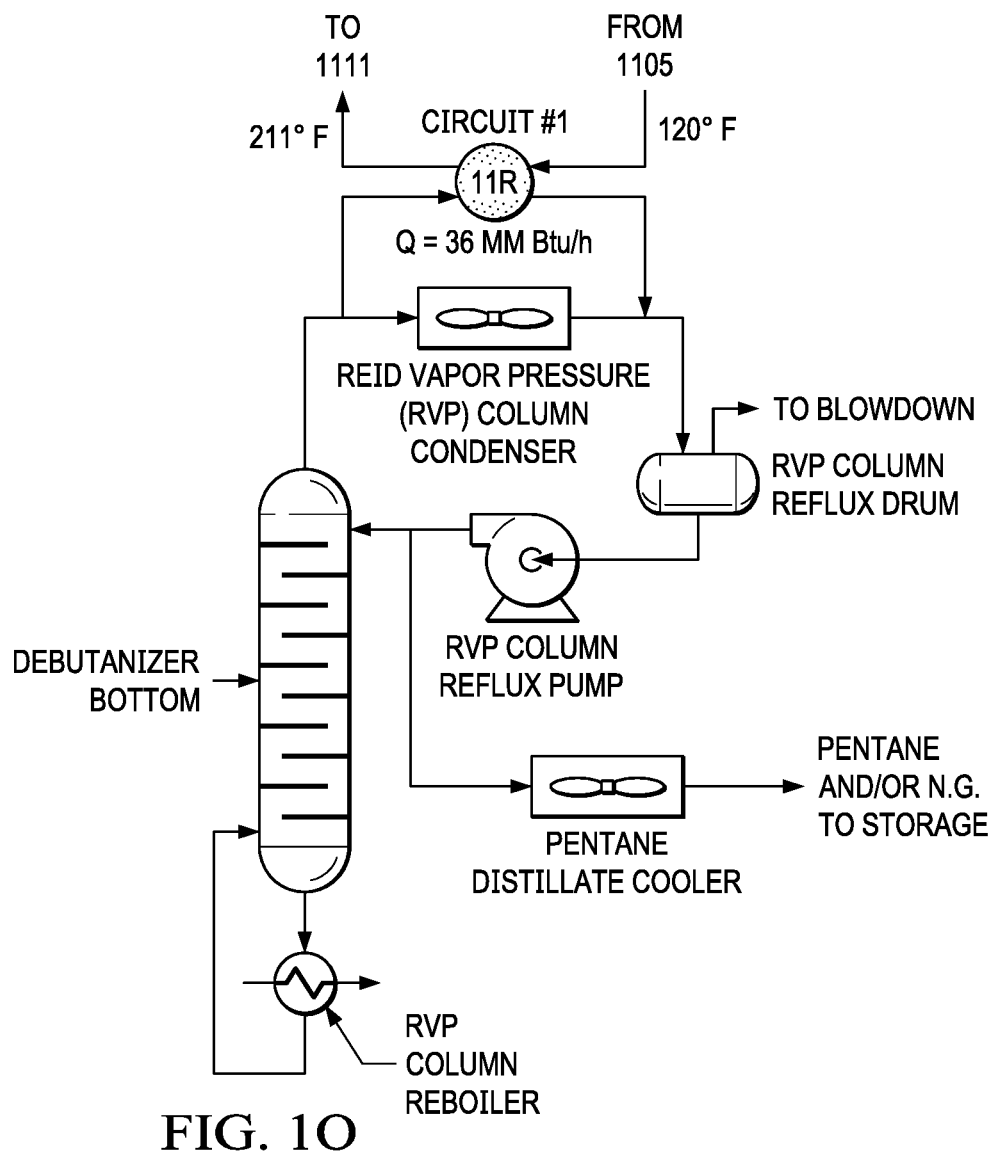

FIG. 1N is a schematic diagram of an ethane production section waste heat recovery system in the NGL fractionation plant. A $17^{th}$ heat exchanger 11q is located in the ethane production section of the NGL fractionation plant. In some implementations, the hot oil flows from the storage tank 1105 to the $17^{th}$ heat exchanger 11q to cool down the ethane dryer outlet stream. In turn, the temperature of the hot oil stream increases to between 405° F. and 415° F. (for example, 410° F.). The heated oil stream flows to the collection header to join other hot oil streams to flow to the Kalina cycle system 1111. The total thermal duty of the 17$^{th}$ heat exchanger 11$q$ is between 15 MM Btu/h and 25 MM Btu/h (for example, about 22 MM Btu/h).

FIG. 1O is a schematic diagram of a natural gasoline vapor pressure control section waste heat recovery system in the NGL fractionation plant. An 18$^{th}$ heat exchanger 11$r$ is located in the natural gasoline vapor pressure control section of the NGL fractionation plant. In some implementations, the hot oil flows from the storage tank 1105 to the 18$^{th}$ heat exchanger 11$r$ to cool down the RVP control column overhead outlet stream. In turn, the temperature of the hot oil stream increases to between 205° F. and 215° F. (for example, 211° F.). The heated oil stream flows to the collection header to join other hot oil streams to flow to the Kalina cycle system 1111. The total thermal duty of the 18$^{th}$ heat exchanger 11$r$ is between 30 MM Btu/h and 40 MM Btu/h (for example, about 36 MM Btu/h).

Figure 1P:
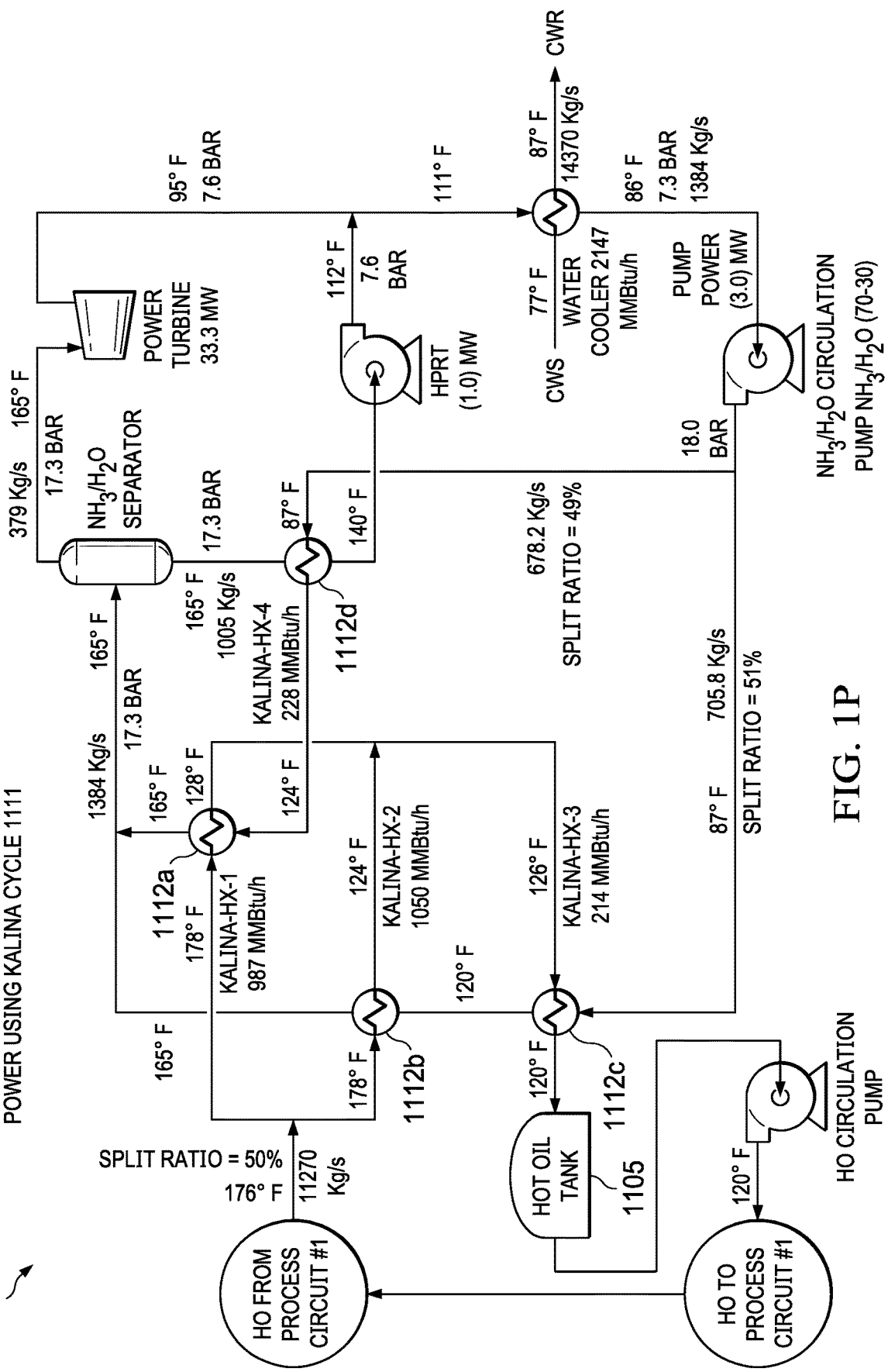
FIG. 1P is a schematic diagram of a Kalina cycle.

FIG. 1P is a schematic diagram of a Kalina cycle 1111. In some implementations, the Kalina cycle 1111 can be implemented to use specific mixtures of ammonia and water streams (for example, mixtures in the ratio of 70% to 30% ammonia to water stream) at defined pressures in a heat exchanger network including four heat exchangers (for example, heat exchangers 1112$a$, 1112$b$, 1112$c$ and 1112$d$) to generate between 30 MW and 40 MW (for example, 33.3 MW) of power. The ammonia-water mixture is divided into two branches at about 18 bar. These two branches are heated and partially vaporized using thermal energy of between about 2200 MM Btu/h and 2300 MM Btu/h (for example, 2250 MM Btu/h) of waste heat from the buffer fluid flowed to the Kalina cycle 1111 from the heat exchanger network 1107 and between about 200 MM Btu/h and 250 MM Btu/h (for example, about 228 MM Btu/h) from the Kalina cycle separator bottom stream. The 4-Kalina cycle heat exchangers network configuration is a parallel configuration with two heat exchangers in series in each branch for the ammonia-water stream path.

The thermal duty of the first Kalina heat exchanger 1112$a$ ranges between about 980 MM Btu/h and 990 MM Btu/h (for example, 987 MM Btu/h). The thermal duty of the second Kalina heat exchanger 1112$b$ ranges between about 1045 MM Btu/h and 1055 MM Btu/h (for example, 1050 MM Btu/h). The thermal duty of the third Kalina heat exchanger 1112$c$ ranges between about 210 MM Btu/h and 220 MM Btu/h (for example, 214 MM Btu/h). The thermal duty of the fourth Kalina heat exchanger 1112$d$ ranges between about 220 MM Btu/h and 230 MM Btu/h (for example, 228 MM Btu/h). The ammonia-water liquid stream is partially vaporized in the four Kalina heat exchangers and separated to increased ammonia concentrated vapor stream. The increased ammonia concentrated vapor stream is flowed to the turbine at high pressure where it is expanded to lower pressure of between about 5 bar and 10 bar (for example, about 7.6) to generate power between about 30 MW and 40 MW (for example, 33.3 MW). The stream at a temperature of between about 90° F. and 100° F. (for example, about 95° F.) is condensed using a water cooler.

The increased water concentration liquid stream from the separator is used in a hydraulic pump to generate up to about 5 MW (for example, about 1.0 MW) of power. The two ammonia-water vapor streams are then merged together in one stream, which is condensed in a water cooler with a thermal duty ranging between about 2100 MM Btu/h and 2200 MM Btu/h (for example, about 2147 MM Btu/h) using a water stream at a temperature ranging between about 70° F. and 80° F. (for example, about 77° F.) to continue the cycle as shown in FIG. 1P. In some implementations, the hot oil buffer stream at a temperature ranging between about 190° F. and 200° F. (for example, about 193° F.) is used to pre-heat and partially vaporize the ammonia-water liquid feed (at a pressure ranging between about 10 bar and 20 bar (for example, about 18 bar) and a temperature ranging between about 80° F. and 90° F. (for example, about 87° F.)). The hot oil temperature is then flowed back to the storage tank 1105 to continue the waste heat recovery cycle in the NGL fractionation plant as described earlier.

Figure 1Q:
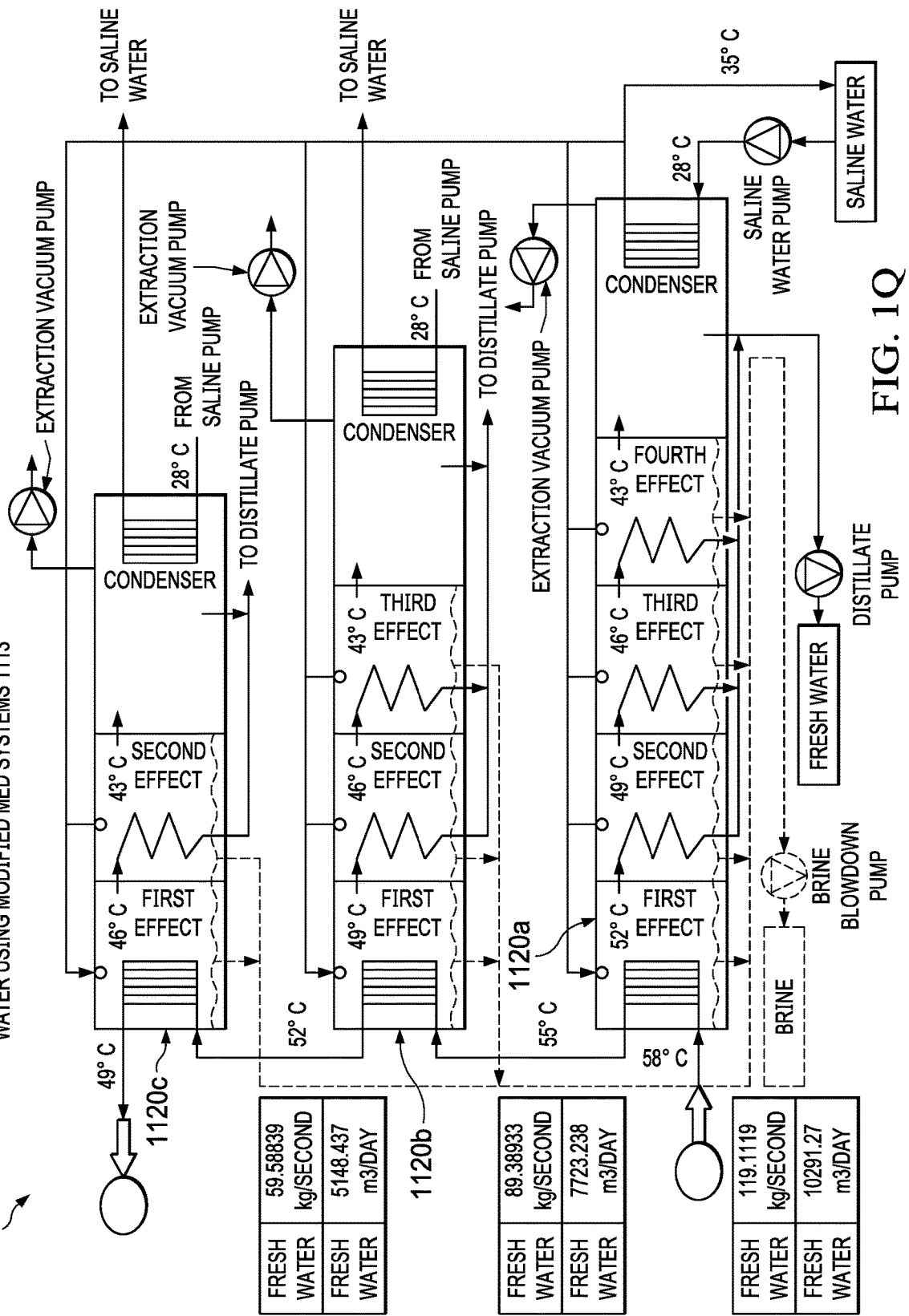
FIG. 1Q is a schematic diagram of a MED phase that includes multiple trains.

FIG. 1Q shows a first MED phase 1113 that includes three trains. The first train 1120$a$ can include 4 effects connected in series. The second train 1120$b$ can include 3 effects connected in series. The third train 1120$c$ can include 2 effects connected in series. The number of trains and the number of effects in this implementation are examples. The MED system 1113 can be implemented to include one or more phases, with each phase having fewer or more trains, each train having fewer or more effects. The arrangement shown in FIG. 1Q represents a best match between the heat duty load and reasonable temperature drop between effects that renders best water production from the available waste heat.

The MED system feed water is distributed onto the heat exchanger of the first effect in all of the trains. The high pressure second buffer fluid, heated in the third heat exchanger 11$c$ (FIG. 1D), releases its energy to the distributed feed water to evaporate a portion of the feed water. The produced vapor then condenses in the heat exchanger of the second effect to evaporate more water in that effect. The brine from the first effect is then purged. At the second effect, the evaporated feed water goes on to power the third effect with the resulting brine being drained from the bottom of the effect. This process continues to the last effect within each train of each phase with the corresponding produced vapor entering the condenser section to be condensed by the incoming saline water acting as a coolant. Part of the pre-heated saline water is then sent to the various effects as feed water. The saline water temperature can be between 25° C. and 35° C. (for example, about 28° C.), and the feed water temperature can be between 30° C. and 40° C. (for example, about 35° C.). The temperature drop from one effect to the next can be between 3° C. and 7° C. (for example, 5° C.).

In some implementations, a steam booster unit is included in the MED system to better exploit the waste heat stream to increase the fresh water yield. The steam booster unit includes an evaporator powered by the outgoing waste heat source of the MED system. The vapor generated from the steam booster unit is introduced into a suitable effect of the MED system. The inclusion of the steam booster unit in the MED system can increase the production rate to the extent allowed by the temperature drop across the steam booster unit.

In some implementations, one or more flashing chambers can be included in the MED system to improve the efficiency of the MED system, to extract more energy from the waste heat, and to utilize the extracted energy to generate stream, thereby increasing fresh water production. In such implementations, the outlet source from the MED system goes on to heat the feed water via a liquid-liquid heat exchanger, which is slightly heated by the outlet brine stream from the last flashing chamber. The heated feed water goes through a series of flashing chambers. The vapor generated from each stage of the flashing is then injected into an effect of the MED system for further boosting.

By identifying a best match between the waste heat load temperature profile and the number of effects used in each train, the quantity of water that can be generated using the MED system is optimized.

Thus, particular implementations of the subject matter have been described. Other implementations are within the scope of the following claims.

The invention claimed is:

1. A method of recovering heat, comprising:
flowing a first buffer fluid through a heat exchanger in a Natural Gas Liquid (NGL) fractionation plant, wherein the NGL fractionation plant comprising a dehydrator column, a distillation column, and a compressor;
transferring heat, via the heat exchanger, from the NGL fractionation plant to the buffer fluid; and
generating power with heat from the buffer fluid in a Kalina cycle system comprising a power turbine.

2. The method of claim 1, wherein the compressor comprises a de-ethanizer refrigeration compressor in a de-ethanizer section comprising a de-ethanizer distillation column of the NGL fractionation plant, and wherein transferring heat via the heat exchanger comprises heating the buffer fluid in the heat exchanger with heat carried by an outlet stream from the de-ethanizer refrigeration compressor.

3. The method of claim 1, wherein the NGL fractionation plant comprises a propane dehydration section comprising the dehydrator column as a propane dehydrator column, and wherein transferring heat via the heat exchanger comprises heating the buffer fluid with heat carried by a propane de-hydration outlet stream from the propane de-hydration section.

4. The method of claim 1, wherein the NGL fractionation plant comprises a de-propanizer section comprising the distillation column as a de-propanizer distillation column, and wherein transferring heat via the heat exchanger comprises heating the buffer fluid in the heat exchanger with heat carried by an overhead outlet stream from the de-propanizer distillation column.

5. The method of claim 1, wherein the NGL fractionation plant comprises a de-pentanizer section comprising the distillation column as a de-pentanizer distillation column, and wherein transferring heat via the heat exchanger comprises heating the buffer fluid with heat carried by an overhead outlet stream from the de-pentanizer distillation column.

6. The method of claim 1, wherein a third subset of the compressor comprises a propane main compressor in a propane product sub-cooling section in the NGL fractionation plant, wherein transferring heat via the heat exchanger comprises heating the buffer fluid with heat carried by an outlet stream from the propane main compressor, and wherein the propane product sub-cooling section further comprises a propane condenser heat exchanger.

7. The method of claim 1, wherein the NGL fractionation plant comprises a butane de-hydrator section comprising the dehydrator column as a butane dehydrator column, and wherein transferring heat via the heat exchanger comprises heating the buffer fluid in the heat exchanger with heat carried by an outlet stream of the butane dehydrator column.

8. The method of claim 1, wherein the NGL fractionation plant comprises a de-butanizer section comprising the distillation column as a de-butanizer distillation column, and wherein transferring heat via the heat exchanger comprises heating the buffer fluid in the heat exchanger with heat carried by an overhead outlet stream from the de-butanizer distillation column or with heat carried by a bottoms outlet stream from the de-butanizer distillation column.

9. The method of claim 1, comprising:
flowing the buffer fluid from a storage tank to the heat exchanger;
flowing the buffer fluid from the heat exchanger via a collection header conduit to the Kalina cycle system; and
flowing the buffer fluid from the Kalina cycle system to the storage tank.

10. The method of claim 1, wherein the NGL fractionation plant comprises an Amine-Di-Iso-Propanol (ADIP) regeneration section comprising the distillation column as an ADIP regeneration distillation column, and wherein transferring heat via the heat exchanger comprises heating the buffer fluid with heat carried by an overhead outlet stream from the ADIP regeneration distillation column or with heat carried by a bottoms stream from the ADIP regeneration distillation column.

11. The method of claim 1, wherein the NGL fractionation plant comprises a natural gas de-colorizing section comprising the distillation column as a natural gas de-colorizer distillation column, and wherein transferring heat via the heat exchanger comprises heating the buffer fluid in the heat exchanger with heat carried by an overhead stream from the natural gas de-colorizer distillation column.

12. The method of claim 1, wherein transferring heat via the heat exchanger comprises heating the buffer fluid in the heat exchanger with heat carried by an outlet stream discharged from the compressor, wherein the compressor is a propane refrigeration compressor in a propane product refrigeration section in the NGL fractionation plant, or wherein the compressor is a butane refrigeration compressor in a butane product refrigeration section in the NGL fractionation plant.

13. The method of claim 1, wherein the NGL fractionation plant comprises a Reid Vapor Pressure (RVP) control section comprising the distillation column as a RVP distillation column, and wherein transferring heat via the heat exchanger comprises heating the buffer fluid comprises with heat carried by an overhead outlet stream from the RVP distillation column.

14. The method of claim 1, wherein the NGL fractionation plant comprises a natural gas de-colorizing section comprising the distillation column as a natural gas de-colorizer distillation column, and wherein transferring heat via the heat exchanger comprises heating the buffer fluid in the heat exchanger with heat carried by an overhead outlet stream from a pre-flash drum in the natural gas de-colorizing section.

15. A method of recovering heat, comprising:
flowing a buffer fluid through a heat exchanger in a Natural Gas Liquid (NGL) fractionation plant, the NGL fractionation plant comprising a distillation column and a compressor;
transferring heat, via the heat exchanger, from the NGL fractionation plant to the buffer fluid; and
generating power via a Kalina cycle system comprising a power turbine with heat from the buffer fluid.

16. The method of claim 15, comprising:
flowing the buffer fluid from a storage tank to the heat exchanger;
flowing the buffer fluid from the heat exchanger via a collection header conduit to the Kalina cycle system; and
flowing the buffer fluid from the Kalina cycle system to the storage tank, wherein the buffer fluid comprises oil.

17. The method of claim 15, wherein the Kalina cycle system partially vaporizes a mixture of ammonia and water with the heat from the buffer fluid to generate the power.

18. The method of claim 15, wherein transferring heat via the heat exchanger comprises heating the buffer fluid in the heat exchanger with heat carried by an outlet stream discharged from the compressor, wherein the compressor is a propane vapor recovery compressor in a propane vapor recovery section in the NGL fractionation plant, the propane vapor recovery section further comprising a propane condenser heat-exchanger.

19. A method of recovering heat, comprising:
flowing a buffer fluid comprising oil through a heat exchanger in a Natural Gas Liquid (NGL) fractionation plant, wherein the NGL fractionation plant comprises a distillation column and a dryer vessel;
transferring heat, via the heat exchanger, from the NGL fractionation plant to the buffer fluid; and
generating power via a Kalina cycle system comprising a power turbine.

20. The method of claim 19, wherein the NGL fractionation plant comprises an ethane production section comprising the dryer vessel as an ethane dryer vessel, and wherein transferring heat via the heat exchanger comprises heating the buffer fluid in the heat exchanger with heat from an outlet stream of the ethane dryer vessel.

\* \* \* \* \*

UNITED STATES PATENT AND TRADEMARK OFFICE
CERTIFICATE OF CORRECTION

PATENT NO. : 11,078,809 B2
APPLICATION NO. : 16/685412
DATED : August 3, 2021
INVENTOR(S) : Noureldin et al.

Page 1 of 1

It is certified that error appears in the above-identified patent and that said Letters Patent is hereby corrected as shown below:

In the Claims

Column 19, Line 11, Claim 1, after "flowing a" delete "first";

Column 19, Line 48, Claim 6, after "wherein" delete "a third subset of".

Signed and Sealed this
Sixteenth Day of November, 2021

Drew Hirshfeld
*Performing the Functions and Duties of the
Under Secretary of Commerce for Intellectual Property and
Director of the United States Patent and Trademark Office*